(12) United States Patent
Ishikawa et al.

(10) Patent No.: US 7,193,978 B2
(45) Date of Patent: Mar. 20, 2007

(54) COMMUNICATIONS SYSTEM EMPLOYING A SCHEME OF RADIO CHANNEL SETTING CONTROL

(75) Inventors: Yoshihiro Ishikawa, Yokosuka (JP); Seizo Onoe, Yokohama (JP); Takaaki Sato, Kawasaki (JP); Yoshitaka Hiramoto, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1045 days.

(21) Appl. No.: 10/072,993

(22) Filed: Feb. 12, 2002

(65) Prior Publication Data

US 2002/0114289 A1 Aug. 22, 2002

(30) Foreign Application Priority Data

Feb. 15, 2001 (JP) ............................. 2001-039180

(51) Int. Cl.
*H04B 7/216* (2006.01)
(52) U.S. Cl. ..................... 370/320; 370/335; 370/342; 455/512
(58) Field of Classification Search ..................... None
See application file for complete search history.

(56) References Cited

U.S. PATENT DOCUMENTS 5,666,655 A * 9/1997 Ishikawa et al. ............ 455/512

6,188,913 B1 * 2/2001 Fukagawa et al. ......... 455/562.1
6,591,108 B1 * 7/2003 Herrig ...................... 455/452.1
6,801,515 B1    10/2004 Ishikawa et al.

FOREIGN PATENT DOCUMENTS

| EP | 0 961 417 A2 * | 5/1999 |
|---|---|---|
| EP | 1 061 762 A1 | 12/2000 |
| JP | 8-19148 | 1/1996 |
| WO | WO 98/30057 | 9/1997 |
| WO | WO 98/17020 | 4/1998 |
| WO | WO 00/35235 | 6/2000 |

* cited by examiner

*Primary Examiner*—Doris H. To
*Assistant Examiner*—Robert W. Wilson
(74) *Attorney, Agent, or Firm*—Oblon, Spivak, McClelland, Maier & Neustadt, P.C.

(57) ABSTRACT

A radio channel setting control method for communications between a base-station apparatus and a mobile-station apparatus in a mobile communications system employing a CDMA scheme comprising the steps of: a) determining whether or not a spread code used for the communications can be allocated; b) determining whether or not a predetermined hardware device can be allocated; c) determining whether or not a radio resource can be allocated; d) setting the radio channel between the base-station apparatus and mobile-station apparatus when it is determined that the spread code, predetermined hardware device and radio resource can be allocated.

37 Claims, 17 Drawing Sheets

FIG.4

| BASE STATION 003 | |
| BASE STATION 002 | |
| BASE STATION 001 | |

| CHANNELIZATION CODE # | USE SITUATION ($\begin{smallmatrix}1:\text{ON USE}\\0:\text{VACANT}\end{smallmatrix}$) |
|---|---|
| 0 | 1 |
| 1 | 0 |
| 2 | 1 |
| ⋮ | ⋮ |
| M | 0 |

FIG.6

| HARDWARE DEVICE # | USE SITUATION<br>(1 : ON USE<br>0 : VACANT) |
|---|---|
| 1 | 1 |
| 2 | 0 |
| 3 | 1 |
| . | . |
| . | . |
| . | . |
| N | 0 |

FIG.9

| | BASE STATION 003 | |
| BASE STATION 002 | | |
| BASE STATION 001 | | |

| HARDWARE DEVICE # | USE SITUATION (1 : ON USE / 0 : VACANT) |
|---|---|
| 1 | 1 |
| 2 | 0 |
| 3 | 1 |
| . | . |
| . | . |
| . | . |
| N | 0 |

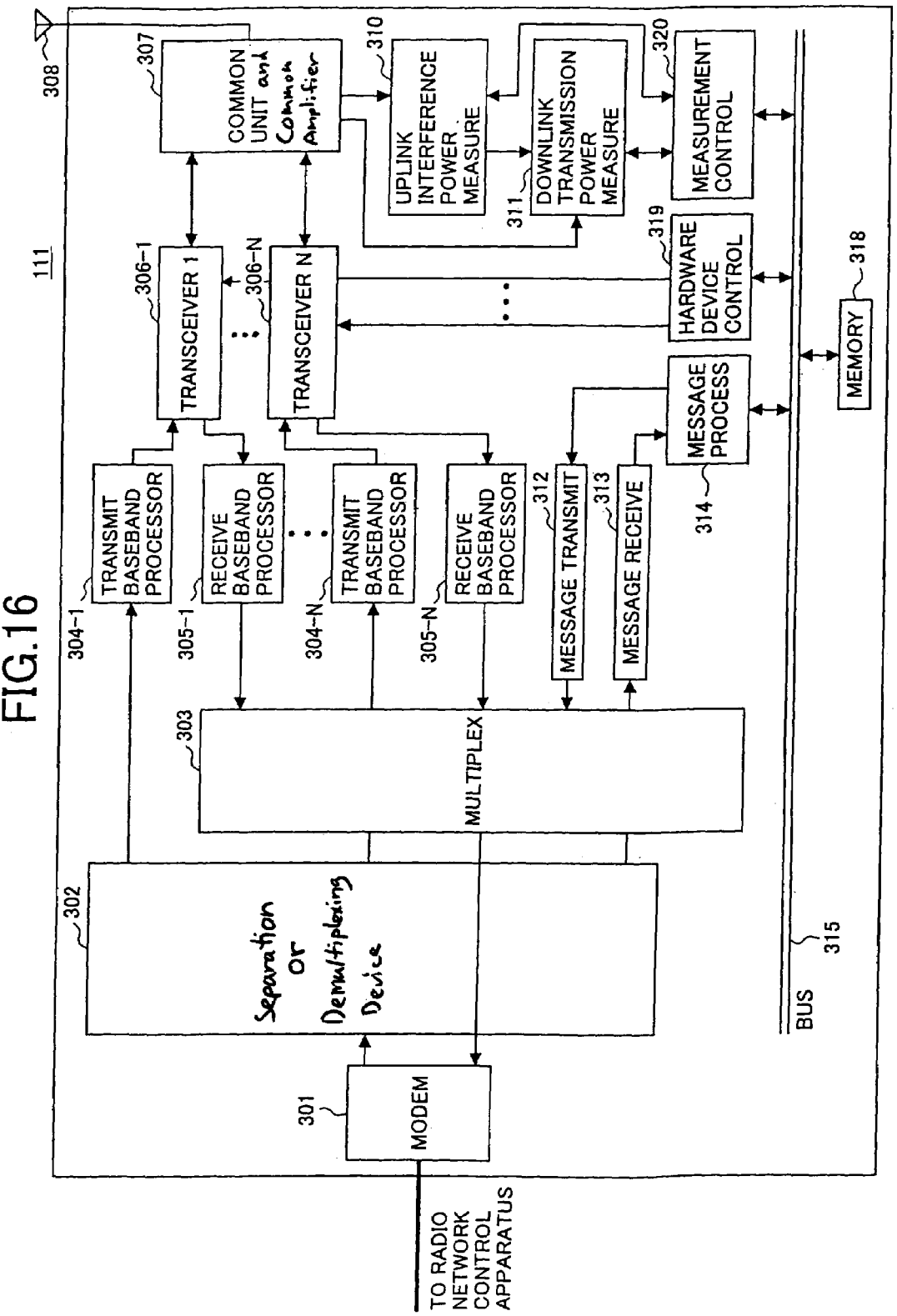

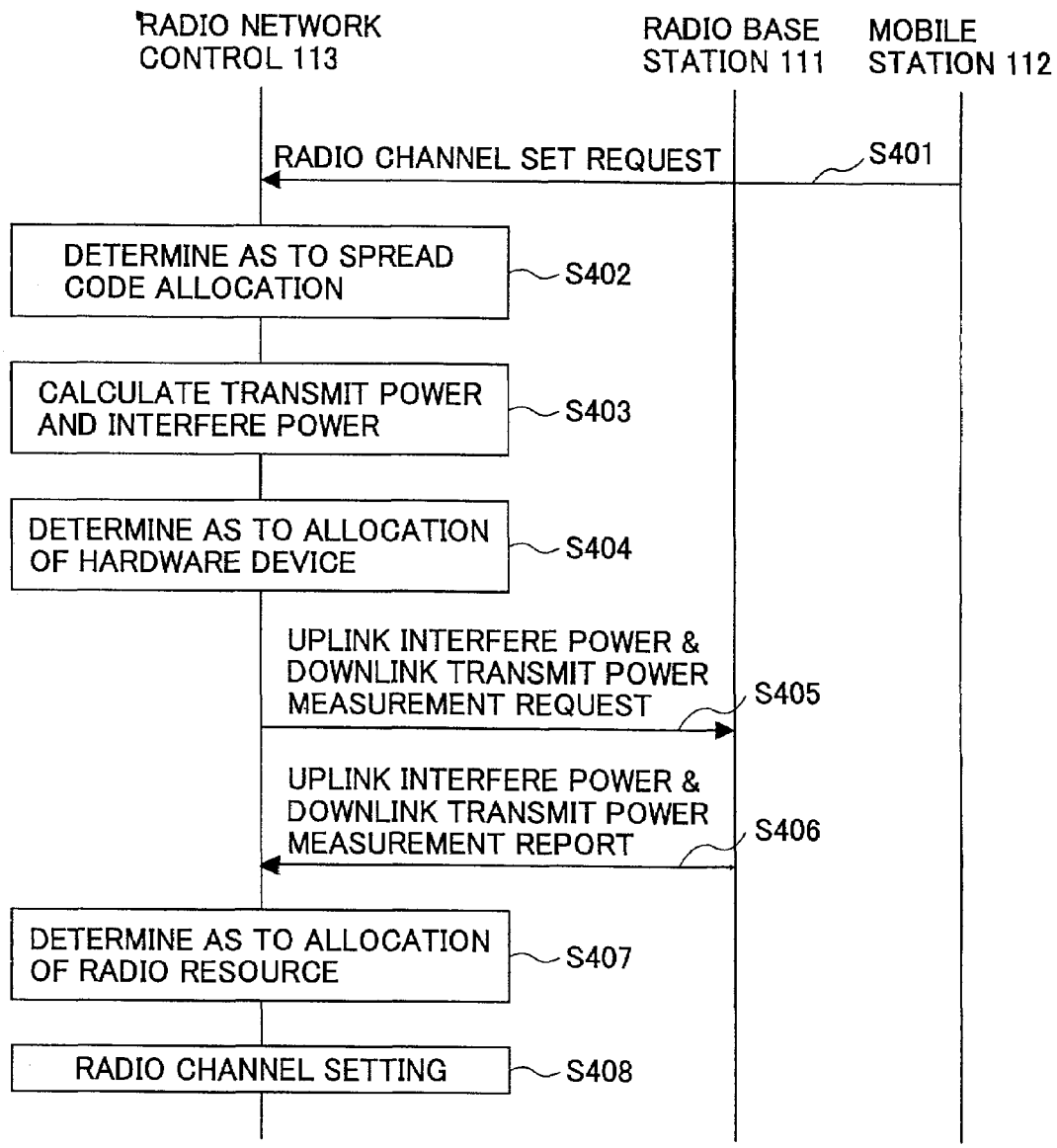

FIG.19

| RADIO BASE STATION # | INTERFERENCE THRESHOLD | TRANSMISSION POWER THRESHOLD |
|---|---|---|
| 0 | THR-i1 | THR-p1 |
| 1 | THR-i2 | THR-p2 |
| 2 | THR-i3 | THR-p3 |
| ... | ... | ... |
| K | THR-iK | THR-pK |

FIG.20

| RADIO CHANNEL TYPE # | INTERFERENCE POWER INCREASE AMOUNT | REQUIRED TRANSMISSION POWER |
|---|---|---|
| 0 | interfere1 | power1 |
| 1 | interfere2 | power2 |
| 2 | interfere3 | power3 |
| ... | ... | ... |
| J | interfereJ | powerJ |

COMMUNICATIONS SYSTEM EMPLOYING A SCHEME OF RADIO CHANNEL SETTING CONTROL

BACKGROUND OF THE INVENTION

1. Field of the Invention

The present invention relates to an improved radio channel setting control scheme, and, in particular, to a radio channel setting control scheme for controlling setting of radio channels used for communications between a base-station apparatus and a mobile-station apparatus in a mobile communications system employing a CDMA scheme.

2. Description of the Related Art

According to a mobile communications system such as a cellular-phone system widely spread recently, the whole service area is divided into relatively small radio zones called cells. Such a mobile communications system includes a plurality of base-station apparatuses which cover respective divided radio zones, mobile-station apparatuses which communicate by setting up radio channels among these base stations, and radio network control apparatuses. Each radio network control apparatus can control a plurality of base-station apparatuses. However, in case very large number of base-station apparatuses exist in a mobile communications system, a plurality of radio network control apparatuses may be provided.

In a CDMA (Code Division Multiple Access) scheme employed between a base-station apparatus and a mobile-station apparatus by which user information is spread into a wider band radio spectrum in proportion to the transmission rate thereof, each radio channel is provided by a spread code. As each user has a different spread code, many users can share a same radio frequency band. A plurality of radio frequency bands each being shared by a plurality of users may be used in case a much increased number of users exist.

Usually, user information is of dozens of kbps through hundreds of kbps, and, according to the CDMA scheme, the user information is spread into a band width of several MHz by the above-mentioned spread code. For example, according to a W-CDMA (Wideband CDMA) scheme, for which a standard has been decided in 3GPP (The Third Generation Partnership Project), the rate (chip rate) by which a bit pattern of a spread code is repeated is 3.84 Mcps.

The specific method of application of the spread code according to W-CDMA is defined in a specification (TS25.213 "Spreading and Modulation (FDD)") provided by 3GPP. The spread code includes a scrambling code allocated for every base-station apparatus for a long period, and a channelization code used in common by all the base-station apparatuses for a short period. A signal transmitted from each base-station apparatus is spread using both the scrambling code and the channelization code.

A plurality codes are previously defined for the scrambling code in the whole system. A system designer selects and allocates codes of these codes to be allocated to each base-station apparatus. Since the allocation design is made such that different scrambling codes may be allocated for the respective base-station apparatuses, the radio channel of each base-station apparatus can be identified by its scrambling code.

On the other hand, different radio channels in the same base-station apparatus can be identified by the channelization codes. The channelization code is designed such that interference between the codes may be cancelled out, namely, such that code series are orthogonal each other, and the number thereof is limited.

When the scrambling codes differ, it is possible to identify, as different radio channels, even if they have a same channelization code. For this reason, when the scrambling codes differ, the same channelization code can be used. In fact, in a mobile communications system using the W-CDMA scheme, the same channelization code is actually used in each base-station apparatus. As mentioned above, since the number of channelization codes is limited, there is a possibility that all the spread codes are on use. For this reason, in case a spread code is allocated, the use situation of the spread code is always recognized, and actual code allocation should be made after examining as to whether it can be allocated, due to the limited number of codes.

By the way, since the CDMA scheme is as above-mentioned a scheme in which many users share the same radio frequency band, all the signals other than a self-communication wave act as interference. Although interference electric power naturally becomes larger as the number of users increases, in order to secure the self-communication wave in a predetermined quality, the ratio of the self-communication wave electric power to the interference electric power needs to be larger than a value by which the quality is maintained. That is, the interference electric power should not become larger without any limitation, and it should have a fixed limit. Accordingly, it can be said that there is a limit also in the number of users which can be accommodated by the system.

Japanese laid-open patent application No. 8-19148, 'Call Acceptance Control Method and Apparatus', and international publication No. WO98/30057, 'Call Acceptance Method in CDMA Mobile Communications System and Mobile-Station Apparatus' disclose arts in which a user accommodation situation is monitored, and it is determined as to whether or not a new call is to be accepted according to the CDMA scheme.

According to Japanese laid-open patent application No. 8-19148, determination is made as to whether or not a new call is to be accepted based on an estimation on interference power in the base-station apparatus. According to this publication, in an uplink circuit (directed from a mobile-station apparatus to a base-station apparatus) in a mobile communications system according to CDMA, the interference power is an important factor in the viewpoint of communications quality.

On the other hand, according to the international publication No. WO98/30057, information concerning uplink interference power (total of interference power in the direction from a mobile-station apparatus to a base-station apparatus) and information concerning downlink transmission power (total of transmission power in the direction from the base-station apparatus to the mobile-station apparatus) is reported, and, thereby, the mobile-station apparatus determines as to whether or not a new call is to be accepted. According to the publication, transmission power in the base-station apparatus is an important factor in the viewpoint of quality of communications, in the downlink circuit (directed from the base-station apparatus to the mobile-station apparatus) in the mobile communications system employing CDMA.

Thus, according to W-CDMA, user accommodation capability may be limited due to the uplink interference power and/or downlink transmission power. Accordingly, it is necessary to determine, after recognizing situation on these uplink interference power and downlink transmission power, whether or not a newly occurring call should be accepted, i.e., whether or not a new radio channel should be set up.

According to W-CDMA mobile communications scheme, in order that a radio channel is set between a base-station apparatus and a mobile-station apparatus, and communications services are provided therethrough, it is necessary to prepare a predetermined hardware device in the base-station apparatus for setting the above-mentioned spread code, performing error correction coding on user information, coding into the radio channel, and spread modulation/demodulation, also, for transmitting the modulated signal as a radio signal, and, also, for receiving a signal from the mobile-station apparatus.

Usually, this hardware device is released and thus can be utilized for another communications purpose after the user terminates the communications, or moves into another cell. As to what hardware device should be prepared in the base-station apparatus is designed depending on the traffic request in the cell, etc. For example, by using the Erlang B formula used conventionally, the number of hardware devices is determined such that a time ratio of occurring a situation in which, since all the hardware devices are on use, and, thus, no new radio channel can be set may be sufficiently small value (for example, several percents). Such a design scheme is disclosed by L. Kleinrock's work, "Queueing Systems" (John Wiley & Sons, 1975) etc. in detail, for example. Thus, it is necessary to always monitor the use situation of the hardware devices in the base-station apparatus, and to determine whether or not a new radio channel is to be set up based thereon.

However, in the mobile communications system according to CDMA, quality communication may be unable to be performed only by monitoring the use situation of spread code or hardware devices described above.

For example, assuming that if the traffic on the adjacent cell increases interference electric power increase in the self-cell. For this reason, there is a possibility in that, even if there are few users under communication within the self-cell and also there is a sufficient margin for spread code or hardware devices, since there is no margin in the radio resources, a new radio channel cannot be set up.

On the other hand, there is a possibility in that, when interference by the traffic in an adjacent cell is small and also the traffic in the self-cell increases, since there is no margin in spread code or in hardware devices even if there is a sufficient margin in radio resources, a new radio channel cannot not be actually set up.

Moreover, when a designer of the system estimates the traffic in the self-cell few, since the number of the hardware devices mounted in the base-station apparatus is insufficient even if there is a sufficient margin in spread code or radio resources, there is a possibility that a new radio channel cannot be actually set up.

SUMMARY OF THE INVENTION

Thus, high communication quality may not be secured only by a study as to a particular factor independently as in the related art, and, thereby, it is necessary to determine whether the setup is possible in consideration of a plurality of factors in a combined manner.

The present invention solves the above-mentioned problem and the purpose thereof is providing a radio network control apparatus, a base-station apparatus, and a mobile communications system by which a radio channel setting control scheme which enables maintaining high communication quality, this scheme being able to be applied to a mobile communications system according to CDMA.

According to the present invention, in a radio channel setting control method of controlling setting of radio channels used for communications between a base-station apparatus and a mobile-station apparatus in a mobile communications system employing a CDMA scheme including the base-station apparatus, a mobile-station apparatus, and a radio network control apparatus controlling the base-station apparatus, it is determined whether or not a spread code used for the communications can be allocated, it is determined whether or not a predetermined hardware device can be allocated, and, also, it is determined whether or not a radio resource can be allocated, and, then, the radio channel is set between the base-station apparatus and mobile-station apparatus when it has been determined that the spread code, predetermined hardware device and radio resource can be allocated.

Thus, as it is determined whether a setup of the radio channel is possible in consideration of these plurality of factors, it is possible to maintain high communication quality.

Moreover, from a viewpoint of taking into consideration of the total of interference electric powers directed to the mobile-station apparatus from the base-station apparatus when setting up the radio channel, it is preferable that, a first uplink interference electric power which is the total of interference electric powers directed to the base-station apparatus from the mobile-station apparatus is measured, and when the thus-obtained first uplink interference electric power is equal to or smaller than a first threshold, it is determined that the radio resource can be allocated.

From the same viewpoint, it is preferable that, it is determined to allow allocation of a radio resource for the uplink circuit directed to the base-station apparatus from the mobile-station apparatus when the first uplink interference electric power is equal to or smaller than the first threshold.

Moreover, from a viewpoint of taking into consideration of the total of transmission electric power directed to the mobile-station apparatus from the base-station apparatus when setting up the radio channel, it is preferable that, a first downlink transmission power which is the total of transmission electric power directed to the mobile-station apparatus from the base-station apparatus is measured, and when the thus-obtained first downlink transmission electric power is equal to or smaller than a second threshold, it is determined to allow allocation of the radio resource.

From the same viewpoint, when the first downlink transmission electric power is equal to or smaller than the second threshold, it may be determined that a radio resources for a downlink circuit directed to the mobile-station apparatus from the base-station apparatus can be allocated.

Further, according to the present invention, allocation allowableness/disallowableness of a spread code used for the communications is determined by the radio network control apparatus, while the first uplink interference electric power and the first down-link transmission electric power are measured by the base-station apparatus. Then, based on the thus-obtained first uplink interference electric power and the first down-link transmission electric power, the allocation allowableness/disallowableness of the radio resource used for the communications is determined, and also, the allocation allowableness/disallowableness of a predetermined hardware device in the base-station apparatus used for the communications is determined. The determination result of the allocation allowableness/disallowableness of the radio resource and predetermined hardware device is then informed to the radio network control apparatus. Then, the radio network control apparatus sets a radio channel when each of all the determination results on the allocation allowableness/disallowableness for the above-mentioned spread code, predetermined hardware device, and radio resource is affirmative.

Further, the allocation allowableness/disallowableness of the spread code used for the communications is determined by the radio network control apparatus, and also the allocation allowableness/disallowableness of the predetermined hardware device in the base-station apparatus used for the communications is determined by the same. Then, the base-station apparatus measures the first uplink interference electric power and the first downlink transmission electric power, and, based on the thus-obtained first uplink interference electric power and first downlink transmission electric power, the allocation allowableness/disallowableness of the radio resource used for the communications is determined by the same, and the determination result of the allocation allowableness/disallowableness of the radio resource is informed of to the radio network control apparatus. Then, when each of all the determination results on the allocation allowableness/disallowableness of the spread code, predetermined hardware device, and the radio resource is affirmative, the radio channel between the base-station apparatus and mobile-station apparatus is set by the radio network control apparatus.

Furthermore, the allocation allowableness/disallowableness of the predetermined hardware device in the base-station apparatus used for the communications is determined by the base-station apparatus, and also, the first uplink interference electric power and first downlink transmission electric power are measured by the same. Then, the determination result of the allocation allowableness/disallowableness of the predetermined hardware device, and the first uplink interference electric power and the first downlink which transmission electric power are informed of to the radio network control apparatus. Then, the radio network control apparatus determines the allocation allowableness/disallowableness of the spread code used for the communications, and, then, based on the first uplink interference electric power and the first downlink transmission electric power informed of by the base-station apparatus, determines the allocation allowableness/disallowableness of the radio resource used for the communications. Then, it sets the radio channel between the base-station apparatus and mobile-station apparatus, when each of all the determination results of the allocation allowableness/disallowableness on the spread code, predetermined hardware device, and the radio resource is affirmative.

Furthermore, preferably, the allocation allowableness/disallowableness of the spread code used for the communications is determined, and the allocation allowableness/disallowableness of the predetermined hardware device in the base-station apparatus used for the communications is determined, by the base-station apparatus. The first uplink interference electric power and first downlink transmission electric power are measured by the base-station apparatus, and thus-obtained first uplink interference electric power and first downlink transmission electric power are informed of to radio network control apparatus. Then, based on the thus-obtained first uplink interference electric power and first downlink transmission electric power informed of by the base-station apparatus, the radio network control apparatus determines the allocation allowableness/disallowableness of the radio resource used for the communications, then, when each of all of the determination results on the allocation allowableness/disallowableness of the spread code, predetermined hardware device, and radio resource is affirmative, the radio network control apparatus sets the radio channel between the base-station apparatus and the mobile-station apparatus.

From a viewpoint of taking into consideration of the total of interference electric power directed from the mobile-station apparatus to the base-station apparatus when setting up a radio channel therebetween, a second uplink interference electric power directed to the base-station apparatus from the mobile-station apparatus newly occurring by the communications is derived, and, also, the first uplink interference electric power which is the total of interference electric power directed to the base-station apparatus from the mobile-station apparatus is measured. Then, the sum of the thus-obtained second uplink interference electric power and first uplink interference electric power is calculated, and when the sum of the first uplink interference electric power and second uplink interference electric power is equal to or smaller than a third threshold, it is determined that allocation of the radio resource used for the communications is allowable. There, in the above description and hereinafter, "to derive" is generically referred to as, to obtain a value through calculation, through using a table, and so forth.

From the same viewpoint, preferably, when the sum of the first uplink interference electric power and the second uplink interference electric power is equal to or smaller than the third threshold, it is determined to allow allocation of a radio resource for the uplink circuit directed to the base-station apparatus from the mobile-station apparatus.

The second uplink interference electric power is derived for every classification/type of the communications. Moreover, the second uplink interference electric power is derived at least based on the chip rate or the information transmission rate of the communications, the signal to noise electric power ratio corresponding to the chip rate or the information transmission rate of the communications, and the uplink interference electric power.

Moreover, from a viewpoint of taking into consideration of the total of transmission electric power directed to the mobile-station apparatus from the base-station apparatus when setting up a radio channel therebetween, the first downlink transmission electric power directed to the mobile-station apparatus from the base-station apparatus is measured, and the second downlink transmission electric power directed to the mobile-station apparatus from the base-station apparatus required for the communications is derived. Then, it is determined to allow allocation of the radio resource, when the sum of the first down-link transmission electric power and second down-link transmission electric power obtained is equal to or smaller than a fourth threshold.

From the same viewpoint, preferably, when the calculated sum of the second downlink transmission electric power and first downlink transmission power is equal to or smaller than the fourth threshold, allocation of a radio resource for a down-link circuit directed to the mobile-station apparatus from the base-station apparatus is allowed.

The above second downlink transmission electric power is derived for every classification/type of the communications. Moreover, the above second downlink transmission electric power is derived based on at least one of the quality of the pilot channel in the mobile-station apparatus and reception electric power.

Alternatively, the second downlink transmission electric power is derived at least based on the ratio of the receiving energy per one chip of the pilot channel to the interference electric power in the mobile-station apparatus, the spreading factor of the physical channel used for the communications, the signal to noise electric power ratio that the communications requires, and the transmission electric power of the pilot channel in the base-station apparatus.

Moreover, the radio network control apparatus determines the allocation allowableness/disallowableness of the spread code used for the communications, derives at least one of the second uplink interference electric power and second downlink transmission electric power. Then, in case the second uplink interference electric power of the above second is derived, the second uplink interference electric power is transmitted to the above-mentioned base-station apparatus. When the second downlink transmission electric power is derived, the second downlink transmission electric power is informed of to the above-mentioned base-station apparatus. Then, the base-station apparatus measures the first uplink interference electric power and first downlink transmission power, and, in case the second uplink interference electric power was transmitted by the radio network control apparatus, the base-station apparatus calculates the sum of the first uplink interference electric power and the second uplink interference electric power, while, in case the second downlink transmission power was transmitted by the radio network control apparatus, the base-station apparatus calculates the sum of the measured first downlink transmission power and the second downlink transmission power.

Then, in case both the sum of the first uplink interference electric power and second uplink interference electric power and the sum of the first downlink transmission power and second downlink transmission power are calculated, the total of the sums is obtained. Then, based on the total of the sums, the allocation allowableness/disallowableness of the radio resource used for the communications, and also, the allocation allowableness/disallowableness of the predetermined hardware device in the base-station apparatus are determined.

In case only the sum of the first uplink interference electric power and second uplink interference electric power is calculated, based thereon, the allocation allowableness/disallowableness of the radio resource used for the communications, and also, the allocation allowableness/disallowableness of the predetermined hardware device in the base-station apparatus are determined.

In case only the sum of the first downlink transmission power and second downlink transmission power is calculated, based thereon, the allocation allowableness/disallowableness of the radio resource used for the communications, and also, the allocation allowableness/disallowableness of the predetermined hardware device in the base-station apparatus are determined.

Then, the thus-obtained determination results on the allocation allowableness/disallowableness of the radio resource and hardware device are informed of to the radio network control apparatus, and, then, the radio network control apparatus sets the radio channel between the base-station apparatus and mobile-station apparatus when each of all of the determination results on the allocation allowableness/disallowableness of the spread code, predetermined hardware device and radio resource is affirmative.

Alternatively, the radio network control apparatus determines the allocation allowableness/disallowableness of the spread code used for the communications, determines the allocation allowableness/disallowableness of the predetermined hardware device in the base-station apparatus used for the communications, and derives at least one of the second uplink interference electric power and second downlink transmission electric power. Then, in case the second uplink interference electric power is derived, the second uplink interference electric power is informed of to the above-mentioned base-station apparatus. In case the second downlink transmission electric power is derived, the second downlink transmission electric power is informed of to the above-mentioned base-station apparatus.

Then, the base-station apparatus measures the first uplink interference electric power and first downlink transmission power. In case the second uplink interference electric power was informed of by the radio network control apparatus, the base-station apparatus calculates the sum of the first uplink interference electric power and the second uplink interference electric power. In case the second downlink transmission power was informed of by the radio network control apparatus, the base-station apparatus calculates the sum of the measured first downlink transmission power and the informed second downlink transmission power.

Then, in case both the sum of the first uplink interference electric power and second uplink interference electric power and the sum of the first downlink transmission power and second downlink transmission power are calculated, the total of the sums is obtained. Then, based on the total of the sums, the allocation allowableness/disallowableness of the radio resource used for the communications is determined.

In case only the sum of the first uplink interference electric power and second uplink interference electric power is calculated, based thereon, the allocation allowableness/disallowableness of the radio resource used for the communications is determined.

In case only the sum of the first downlink transmission power and second downlink transmission power is calculated, based thereon, the allocation allowableness/disallowableness of the radio resource used for the communications is determined.

Then, the thus-obtained determination results on the allocation allowableness/disallowableness of the radio resource is informed of to the radio network control apparatus, and, then, the radio network control apparatus sets the radio channel between the base-station apparatus and mobile-station apparatus when each of all of the determination results on the allocation allowableness/disallowableness of the spread code, predetermined hardware device and radio resource is affirmative.

Alternatively, the radio network control apparatus determines the allocation allowableness/disallowableness the predetermined hardware device in the base-station apparatus used for the communications, and derives the first uplink interference electric power and first downlink transmission power. Then, the determination result on the allocation allowableness/disallowableness of the predetermined hardware device, and the measured first uplink interference electric power and first downlink transmission power are informed of to the radio network control apparatus.

Then, the radio network control apparatus determines allocation allowableness/disallowableness of the spread code used for the communications, derives at least one of the second uplink interference electric power and second downlink transmission electric power. Then, in case the second uplink interference electric power is derived, the sum of the first uplink interference electric power and the second uplink interference electric power is calculated. In case the second downlink transmission electric power is derived, the sum of the first downlink transmission power and the second downlink transmission electric power is calculated.

Then, in case both the sum of the first uplink interference electric power and second uplink interference electric power and the sum of the first downlink transmission power and second downlink transmission power are calculated, the total of the sums is obtained. Then, based on the total of the sums, the allocation allowableness/disallowableness of the radio resource used for the communications is determined.

In case only the sum of the first uplink interference electric power and second uplink interference electric power is calculated, based thereon, the allocation allowableness/disallowableness of the radio resource used for the communications is determined.

In case only the sum of the first downlink transmission power and second downlink transmission power is calculated, based thereon, the allocation allowableness/disallowableness of the radio resource used for the communications is determined.

Then, the radio network control apparatus sets the radio channel between the base-station apparatus and mobile-station apparatus when each of all of the determination results on the allocation allowableness/disallowableness of the spread code, predetermined hardware device and radio resource is affirmative.

Alternatively, the radio network control apparatus determines the allocation allowableness/disallowableness the spread code used for the communications, and determines allocation allowableness/disallowableness of the predetermined hardware device in the base-station apparatus used for the communications, and derives at least one of the second uplink interference electric power and second downlink transmission electric power. Then, the base-station apparatus measures the first uplink interference electric power and first downlink transmission power, which are then informed of to the radio network control apparatus therefrom.

Then, in case the second uplink interference electric power is derived, the sum of the first uplink interference electric power and the second uplink interference electric power is calculated. In case the second downlink transmission electric power is derived, the sum of the first downlink transmission power and the second downlink transmission electric power is calculated.

Then, in case both the sum of the first uplink interference electric power and second uplink interference electric power and the sum of the first downlink transmission power and second downlink transmission power are calculated, the total of the sums is obtained. Then, based on the total of the sums, the allocation allowableness/disallowableness of the radio resource used for the communications is determined.

In case only the sum of the first uplink interference electric power and second uplink interference electric power is calculated, based thereon, the allocation allowableness/disallowableness of the radio resource used for the communications is determined.

In case only the sum of the first downlink transmission power and second downlink transmission power is calculated, based thereon, the allocation allowableness/disallowableness of the radio resource used for the communications is determined.

Then, the radio network control apparatus sets the radio channel between the base-station apparatus and mobile-station apparatus when each of all of the determination results on the allocation allowableness/disallowableness of the spread code, predetermined hardware device and radio resource is affirmative.

Also, a radio network control apparatus according to the present invention is suitable for performing any of the above-described radio channel setting control methods. A base-station apparatus according to the present invention is suitable for performing any of the above-described radio channel setting control methods. A mobile communications system according to the present invention is suitable for performing any of the above-described radio channel setting control methods.

BRIEF DESCRIPTION OF THE DRAWINGS

Other objects and further features of the present invention will become more apparent from the following detailed description when read in conjunction with the following accompanying drawings:

FIG. 4 shows an example of a spread code management table in the first embodiment of the present invention;

FIG. 6 shows an example of a hardware device management table in the first embodiment of the present invention;

FIG. 9 shows an example of a hardware device management table in the second embodiment of the present invention;

FIG. 16 shows an example of a configuration of the base-station apparatus in the fourth embodiment of the present invention;

FIG. 17 shows a sequence illustrating operation of the mobile communications system in the fourth embodiment of the present invention;

FIG. 18 shows an example of a threshold table managed in the base-station apparatus, according to the present invention;

FIG. 19 shows an example of a threshold table managed in the radio network control apparatus, according to the present invention; and FIG. 20 shows an example of a parameter table according to the present invention.

DESCRIPTION OF THE PREFERRED EMBODIMENTS

Hereafter, preferred embodiments of the present invention will be described based on the drawings.

Figure 1:
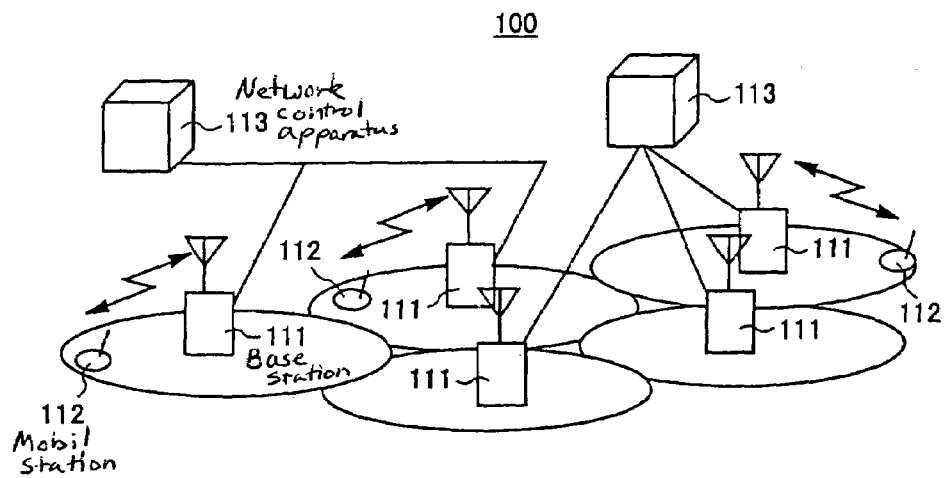
FIG. 1 shows an example of a configuration of a mobile communications system.

FIG. 1 shows an example of a configuration of a mobile communications system by which a radio channel setting control method according to any embodiment of the present invention may be performed.

The mobile communications system 100 shown in FIG. 1 includes a plurality of base-station apparatuses 111 each of which covers a respective one of divided radio zones (cells), mobile-station apparatuses 112 each of which communicates by setting up a radio channel with these base stations, and radio network control apparatuses 113. Each of the radio network control apparatuses 113 controls a plurality of base-station apparatus 111, and, in case a large number of base-station apparatuses exist in the mobile communications system, the plurality of radio network control apparatuses 113 are provided.

A W-CDMA scheme which is one of CDMA schemes by which user information transmitted between base-station apparatus 111 and mobile-station apparatus 112 is spread into a wide-band radio spectrum in proportion to the transmission rate of the information to be transmitted therebetween is employed for the mobile communications system 100. Accordingly, a radio channel is defined by a spread code in the mobile communications system 100. A same radio frequency band is shared among respective users by using the spread codes different from each other. Also, a plurality of radio frequency bands each shared by such a plurality of users can also be used upon increase of the number of users.

Figure 2:
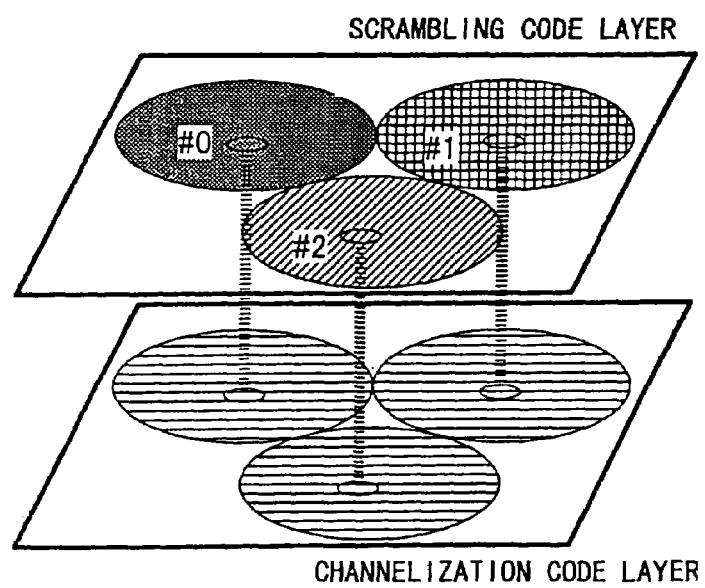
FIG. 2 shows a conceptual drawing for illustrating an application way of a spread code.

FIG. 2 shows a concept of how to apply the spread code. The spread code includes a scrambling code allocated for every base-station apparatus for a long period, and a channelization code used in common for all the base-station apparatuses for a short period. A signal sent out from each base-station apparatus is spread by using both the scrambling code and channelization code.

As for the scrambling code, a plurality of codes for the whole system are previously determined, and different codes are allocated for respective base-station apparatuses. For this reason, the radio channel of each base-station apparatus is identified by the scrambling code.

On the other hand, different radio channels in the same base-station apparatus are identified by the channelization code. The channelization code is designed such that interference between the codes may be cancelled out, and the number thereof is limited. When the scrambling codes differ, radio channels can be identified even in case they have the same channelization code. For this reason, when the scrambling codes differ, the same channelization code can be used for the different radio channels.

Figure 3:
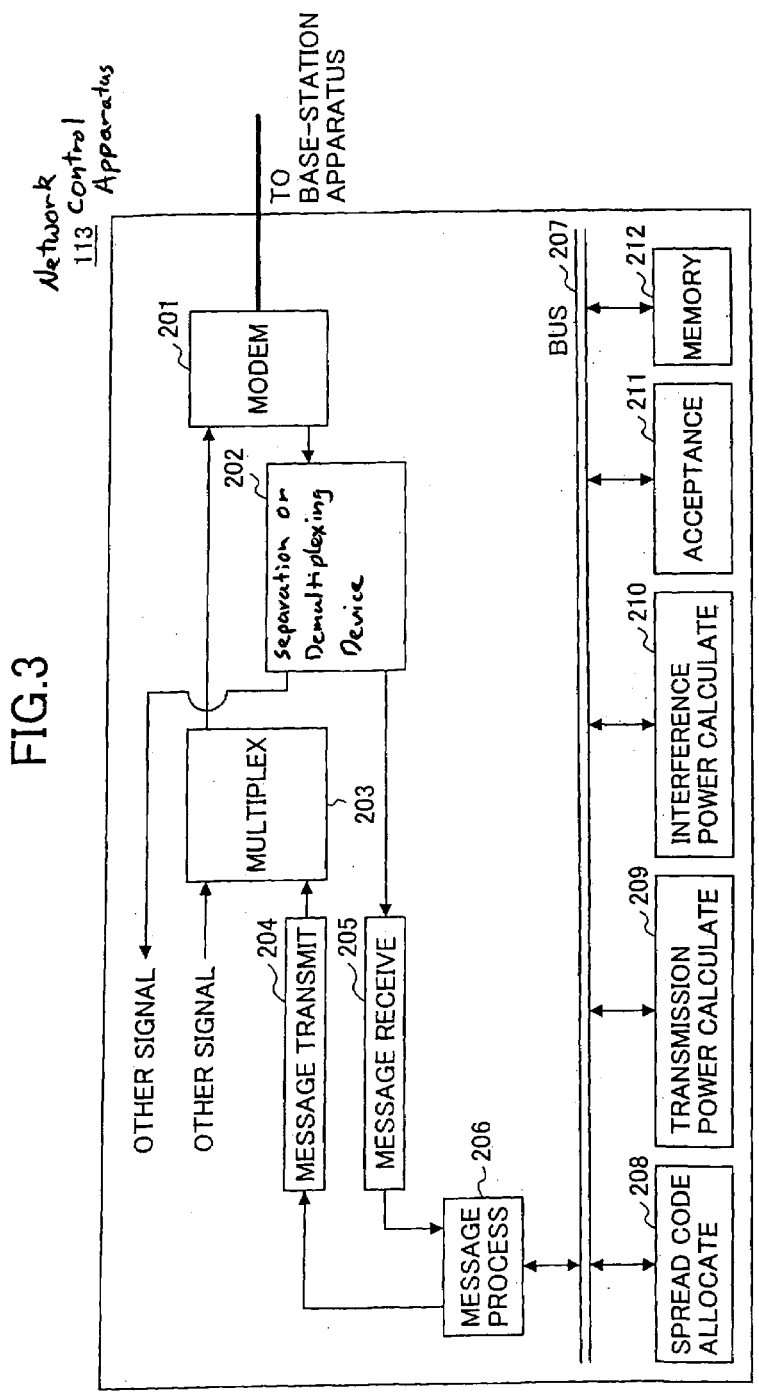
FIG. 3 shows an example of a configuration of a radio network control apparatus in a first embodiment of the present invention.

A first embodiment of the present invention will now be described. FIG. 3 shows an example of a configuration of a radio network control apparatus in the first embodiment of the present invention. Only functions such as those required for setting up a radio channel between the base-station apparatus 111 and the mobile-station apparatus 112 are shown of various functions of the radio network control apparatus 113, for the purpose of simplification of illustration.

The radio network control apparatus 113 shown in FIG. 3 includes a modem 201, a separation/demultiplexing device 202, a multiplexing device 203, a message transmitter 204, a message receiver 205, a message processing part 206, a bus 207, a spread code management/allocation processing part 208, a transmission electric power calculation part 209, an interference electric power calculation part 210, an acceptance decision part 211, and a memory 212.

The modem 201 performs transmission/reception of information with the subordinate base-station apparatuses 111. The modem 201 outputs a signal to the separation device 202, when receiving the signal from the base-station apparatus 111. The modem 201 transmits a signal given from the multiplexing device 203 to the base-station apparatus 111. The separation (demultiplexing) device 202 is for separating/extracting/demultiplexing a signal of a message from other signals given from the base-station apparatus 111. The multiplexing device 203 is for carrying out multiplexing of a message with other signals addressed to the base-station apparatus 111.

The message transmitter 204 outputs a message to be transmitted to the base-station apparatus 111, to the multiplexing device 203. The message receiver 205 receives a message given from the base-station apparatus 111. The message processing part 206 produces a message to be transmitted to the base-station apparatus 111, and decodes a message given from the base-station apparatus 111.

The message processing part 206, spread code management/allocation processing part 208, transmission electric power calculation part 209, interference electric power calculation part 210, acceptance decision part 211, and memory 212 are connected through the bus 207.

The spread code management/allocation processing part 208 manages use situations of the spread codes in the subordinate base-station apparatuses 111 based on a spread code management table stored in the memory 212. The spread code management/allocation processing part 208 determines whether it is possible to allocate a spread code for the base-station apparatus 111, when there is a request such that a radio channel be set up between the base-station apparatus 111 and mobile-station apparatus 112. Furthermore, the spread code management/allocation processing part 208 performs allocation processing of a spread code on the occasion of communications between the base-station apparatus 111 and mobile-station apparatus 112.

FIG. 4 shows an example of the spread code management table in the first embodiment. This spread code management table is provided for every base-station apparatus 111 subordinate of the radio network control apparatus 113, and includes channelization codes and information which shows the use situation on each channelization code.

The spread code management/allocation processing part 208 determines that a spread code can be allocated and when there is a vacant channelization code with reference to the spread code management table stored in the memory 212. When a radio channel is thus set up, the spread code management/allocation processing part 208 allocates the vacant channelization code therefor, and changes the corresponding use situation into "on use (actually, "1" in the table)". On the other hand, the spread code management/allocation processing part 208 changes into "vacant (actually, "0" in the table)" the corresponding use situation, when use of the radio channel is finished and thus, the channelization code is released.

The transmission electric power calculation part 209 calculates a downlink transmission power directed from the base-station apparatus 111 to the mobile-station apparatus 112, required for communications between the mobile-station apparatus 112 and the base-station apparatus 111 using the radio channel, assuming that this radio channel is set in response to the radio channel setting request.

The interference electric power calculation part 210 calculates an uplink interference electric power occurring from communications between the base-station apparatus 111 and the mobile-station apparatus 112 using the radio channel, directed to the base-station apparatus 111 from the mobile-station apparatus 112, when it is assumed that the radio channel is set up according to the setting request for radio channel.

The downlink transmission electric power and the uplink interference electric power thus calculated are informed of to base-station apparatus 111.

The acceptance decision part 211 acquires a determination result of allocation allowableness/disallowableness of spread code in the spread code management/allocation processing part 208, and a determination result of allocation allowableness/disallowableness of radio resources and hardware devices in the base-station apparatus 111, described later, and determines whether or not a radio channel can be set up, based on these determination results. When a radio channel can be set up, the radio network control apparatus 113 performs processing of setting up a radio channel.

Figure 5:
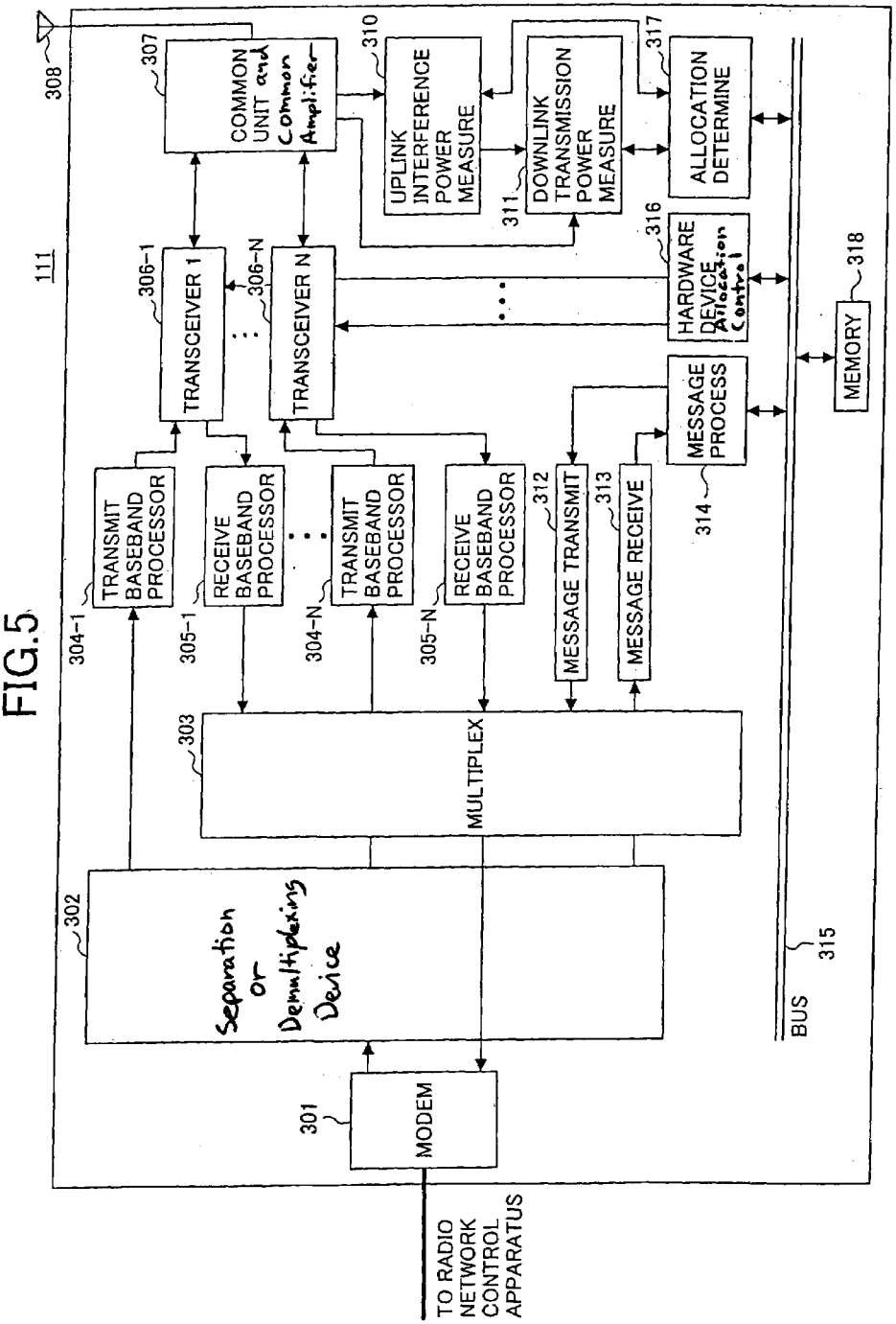
FIG. 5 shows an example of a configuration of a base-station apparatus in the first embodiment of the present invention.

FIG. 5 shows an example of a configuration of the base-station apparatus in the first embodiment of the present invention. Only functions such as those required for setting up a radio channel between the mobile-station apparatus 112 and the base-station apparatus 111 are shown of various functions of the base station, for the sake of simplification of illustration.

The base-station apparatus 111 shown in FIG. 5 includes a modem 301, a separation (demultiplexing) device 302, a multiplexing device 303, N transmitting baseband processors 304-1 through 304-N, N reception baseband processors 305-1 through 305-N, N transceivers 306-1 through 306-N, a common unit and common amplifier 307, an antenna 308, an uplink interference electric power measuring unit 310, a downlink transmission electric power measuring unit 311, a message transmitter 312, a message receiver 313, a message processing part 314, a bus 315, a hardware device allocation control part 316, an allocation allowableness/disallowableness determining part 317, and a memory 318.

The modem 301 performs transmission/reception of information with the radio network control apparatus 113. The modem 301 outputs a signal to the separation device 302, when receiving the signal from the radio network control apparatus 113. Moreover, the modem 301 transmits a signal from the multiplexing device 303 to the radio network control apparatus 113.

The separation device 302 is used for separating/demultiplexing a signal of a message given from the radio network control apparatus 113, from other signals. The multiplexing device 303 is used for carrying out multiplexing of a message addressed to the radio network control apparatus 113, to other signals.

Each of the N transmitting baseband processors 304-1 through 304-N processes a signal from the separation device 302, and outputs it to a corresponding one of the N transceivers 306-1 through 306-N. Each of the N reception baseband processors 305-1 through 305-N processes a signal from a corresponding one of the N transceivers 306-1 through 306-N, and outputs it to the multiplexing device 303.

Each of the N transceivers 306-1 through 306-N transmits a signal from a corresponding one of the N transmitting baseband processors 304-1 through 304-N to the mobile-station apparatus 112 through the common unit and common amplifier 307, and antenna 308. Each of the N transceivers 306-1 through 306-N receives, through the antenna 308 and common unit and common amplifier 307, and outputs a signal from mobile-station apparatus 112, to a corresponding one of the N reception baseband processing part 305-1 through 305-N.

When communications are performed between one base-station apparatus 111 and one mobile-station apparatus 112, one transceiver 306 is needed as a hardware device.

The uplink interference electric power measuring unit 310 measures the total (referred to as "a first uplink interference electric power", hereafter) of the interference electric power directed to the base-station apparatus 111 from the mobile-station apparatus 112 at this time, before setting up a radio channel according to a setting request, based on a signal from the mobile-station apparatus 112, which the common unit and common amplifier 307 outputs.

The downlink transmission electric power measuring unit 311 measures the total (referred to as "a first downlink transmission electric power", hereinafter) of the transmission electric power directed to the mobile-station apparatus 112 from the base-station apparatus 111 at this time, before setting up a radio channel according to a setting request, based on a signal directed to the mobile-station apparatus 112, which the common unit and common amplifier 307 outputs.

The message transmitter 312 outputs a message to be transmitted to the radio network control apparatus 113, to the multiplexing device 303. The message receiver 313 receives a message from the radio network control apparatus 113. The message processing part 314 produces a message to be transmitted to the radio network control apparatus 113, and decodes a message given from the radio network control apparatus 113.

The message processing part 314, hardware device allocation control part 316, allocation allowableness/disallowableness determining part 317, and memory 318 are connected through the bus 315.

The hardware device allocation control part 316 manages the use situations on the transceivers 306-1 through 306-N based on a hardware device management table stored in the memory 318. The hardware device allocation control part 316 determines whether it is possible to allocate any of the transceivers 306-1 through 306-N, when there is a request such that a radio channel may be set up between the base-station apparatus 111 and mobile-station apparatus 112. Furthermore, the hardware device allocation control part 316 performs processing which allocates any of the transceiver 306-1 through 306-N on the occasion of communications between the base-station apparatus 111 and mobile-station apparatus 112.

FIG. 6 shows an example of the hardware device management table in the first embodiment of the present invention. This hardware device management table includes codes for identifying the respective hardware devices (the transceivers 306-1 through 306-N), and information which shows the use situation of each of the transceivers 306-1 through 306-N.

The hardware device allocation control part 316 determines that allocation is possible when there is a vacant transceiver 306 with reference to the hardware device management table stored in the memory 318. When a radio channel is set up, the hardware device allocation control part 316 allocates the vacant transceiver 306 therefor, and changes the corresponding use situation into "on use (actually, "1" in the table)". The hardware device allocation control part 316 changes, into "vacant (actually, "0" in the table)" the corresponding use situation, when the use of the radio channel is finished and thus, the transceiver 306 is released.

In response to a request such as to set a radio channel between the base-station apparatus 111 and mobile-station apparatus 112, the allocation allowableness/disallowableness determining part 317 calculates a sum of the first uplink interference electric power measured by the uplink interference electric power measurement unit 310 and an uplink interference electric power (referred to as "a second uplink interference electric power electric power", hereinafter) calculated and transmitted by the radio network control apparatus 113, and, also, calculates a sum of the first downlink transmission electric power measured by the downlink transmission electric power measurement unit 311, and a downlink transmission power (referred to as "a second downlink transmission electric power", hereinafter) calculated and transmitted by the radio network control apparatus 113.

Then, when the thus-obtained sum of the first uplink interference electric power and the second uplink interference electric power is equal to or smaller than a predetermined threshold, the allocation allowableness/disallowableness determining part 317 determines that radio resources for an uplink circuit directed to the base-station apparatus 111 from the mobile-station apparatus 112 can be allocated. When the obtained sum of the first downlink transmission electric power and second downlink transmission electric power is equal to or smaller than a predetermined threshold, the allocation allowableness/disallowableness determining part 317 determines that radio resources can be allocated for a downlink circuit directed to the mobile-station apparatus 112 from the base-station apparatus 111. The allocation allowableness/disallowableness determining part 317 finally determines that the radio resources can be allocated when the radio resources for both the uplink circuit and downlink circuit can be allocated.

The determination result on the allocation allowableness/disallowableness of these transceivers 306-1 through 306-N and the determination result on the allocation allowableness/disallowableness of the radio resources are informed of to the radio network control apparatus 113 as the message.

Figure 7:
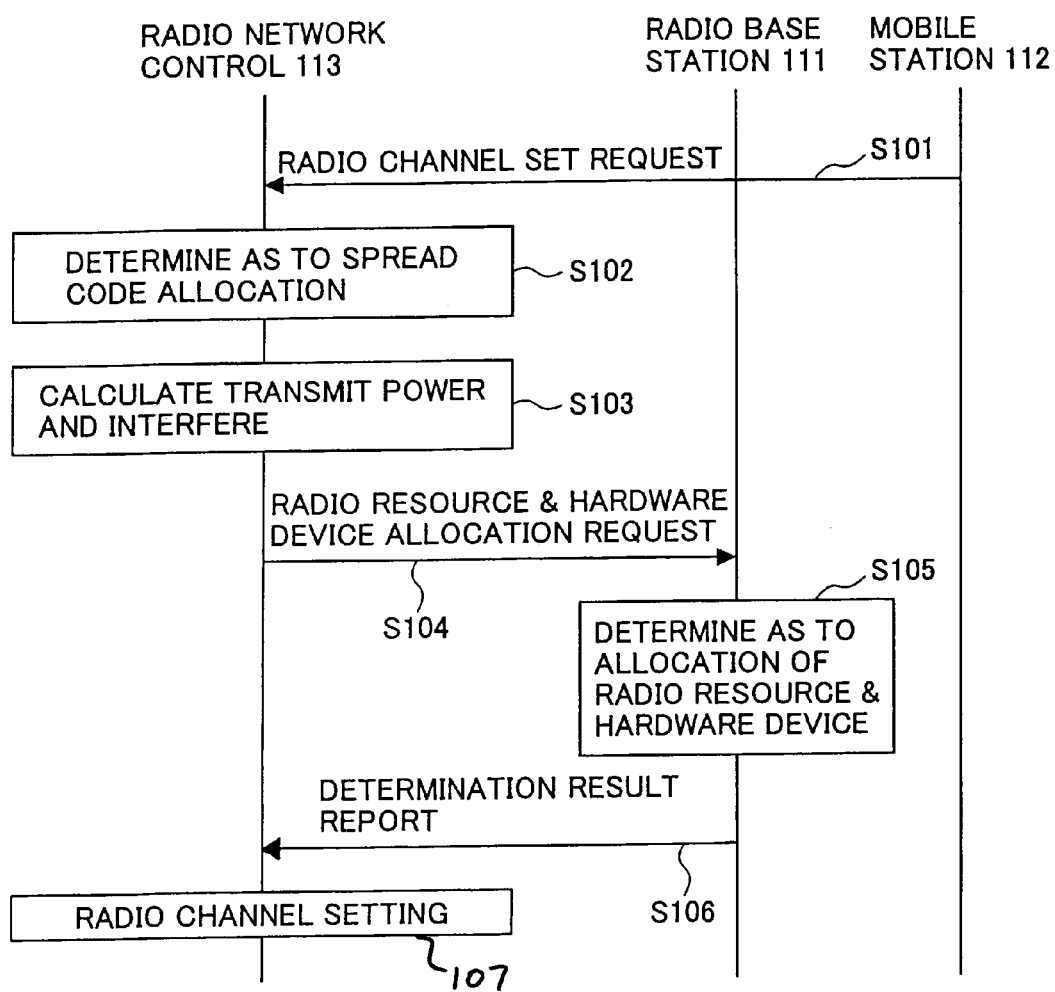
FIG. 7 shows a sequence showing operation of a mobile communications system in the first embodiment of the present invention.

FIG. 7 shows operation of the mobile communications system 100 in the first embodiment. The mobile-station apparatus 112 requires a setup of a radio channel from the radio network control apparatus 113 through the base-station apparatus 111 (in a in a step The radio network control apparatus 113 determines whether or not allocation of a spread code on the base-station apparatus 111 when this setting request for the radio channel is received (in a in a step S102). When allocation of a spread code is not possible, the radio network control apparatus 113 informs the mobile-station apparatus 112 of this matter, and ends the processing.

When allocation of a spread code is possible, the radio network control apparatus 113 then calculates the second downlink transmission electric power and the second uplink interference electric power (in a in a step S103), and a message which requires allocation of radio resources and hardware device is transmitted to the base-station apparatus 111 (in a in a step S104). This message includes the calculated second downlink transmission electric power and second uplink interference electric power.

When receiving this message, the base-station apparatus 111 makes a determination as to allocation allowableness/disallowableness of radio resources, and also, as to allocation allowableness/disallowableness of hardware device based on the measured first downlink transmission electric power and first uplink interference electric power, and also, the second downlink transmission electric power and second uplink interference electric power included in the received message (in a step S105), and, then, informs of these determination results to the radio network control apparatus 113 (in a step S106).

The radio network control apparatus 113 performs processing which sets up a radio channel, when the these-informed determination results indicates allocation allowableness (in a step S107). However, when any of the thus-informed determination results indicates allocation disallowableness, the radio network control apparatus 113 informs the mobile-station apparatus 112 of this matter, and ends the processing.

Figure 8:
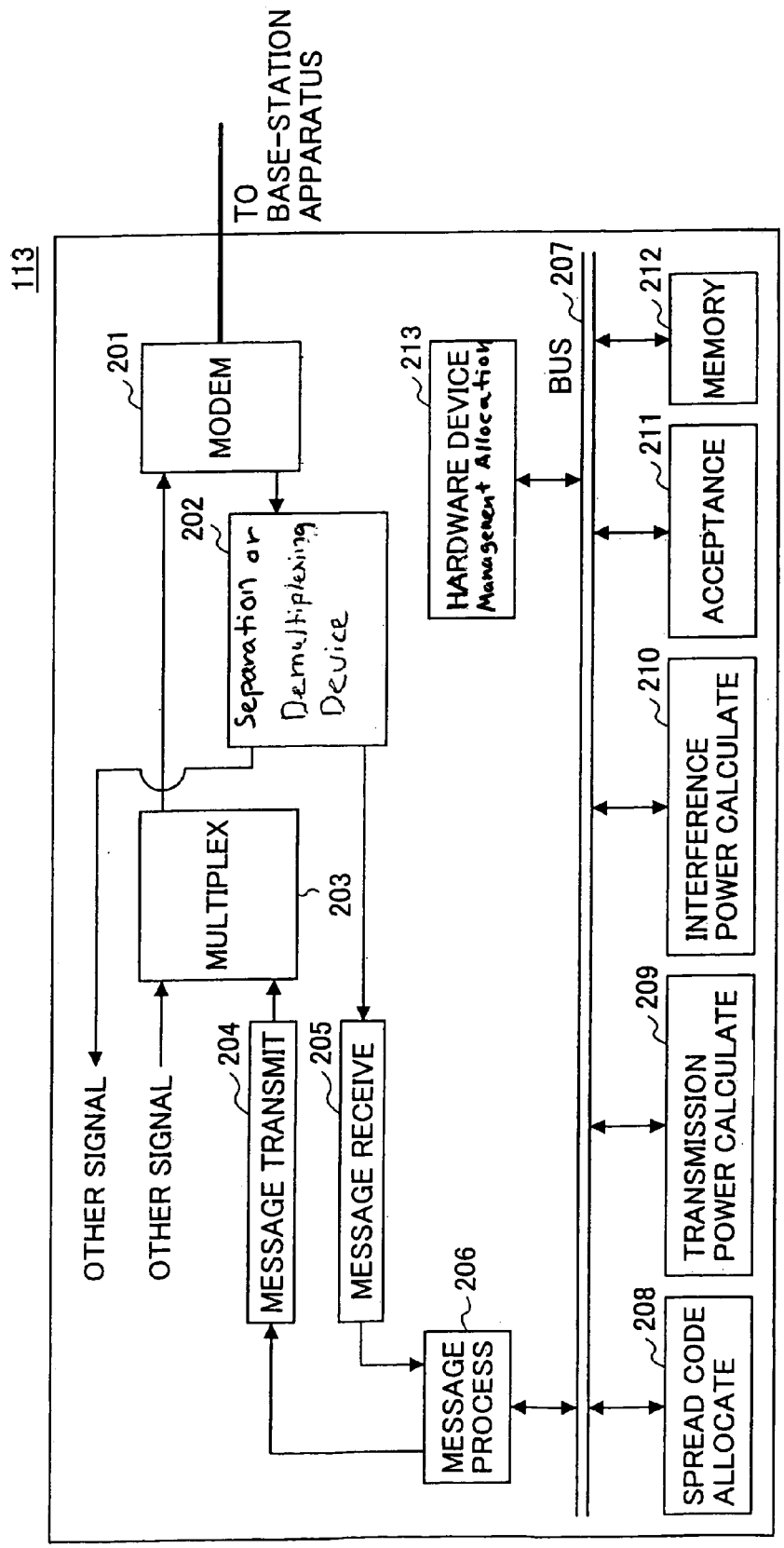
FIG. 8 shows an example of a configuration of a radio network control apparatus in a second embodiment of the present invention.

A second embodiment of the present invention will now be described. FIG. 8 shows an example of a configuration of a radio network control apparatus in the second embodiment of the present invention. As compared with the radio network control apparatus 113 in the first embodiment shown in FIG. 3, the radio network control apparatus 113 shown in FIG. 8 additionally includes a hardware device management/allocation processing part 213.

The hardware device management/allocation processing part 213 manages the use situations of the hardware devices in the base-station apparatus 111 (N transceivers) based on a hardware device management table stored in the memory 212. Moreover, the hardware device management/allocation processing part 213 determines whether it is possible to allocate the transceivers 306-1 through 306-N, when there is a request such that a radio channel be set up between the base-station apparatus 111 and the mobile-station apparatus 112. Furthermore, the hardware device management/allocation processing part 213 directs to allocate the hardware device (transceiver), to the base-station apparatus 111, on the occasion of communications between the base-station apparatus 111 and the mobile-station apparatus 112.

FIG. 9 shows an example of the hardware device management table in the second embodiment. This hardware device management table is provided for every base-station apparatus 111 subordinate of the radio network control apparatus 113, and includes codes for identifying the hardware devices (N transceivers), respectively, on each base-station apparatus 111, and the information which shows the use situation on each transceiver.

The hardware device management/allocation control part 213 determines that the allocation is possible when there is a vacant transceiver, with reference to the hardware device management table stored in the memory 212. When a radio channel is set up, the hardware device management/allocation processing part 213 directs the radio base station 111 to allocate the vacant transceiver therefor, and it changes the corresponding use situation into "on use (actually, "1" in the table)". The hardware device management/allocation processing part 213 changes, into "vacant (actually "0" in the table)", the corresponding use situation, when the use of the radio channel is finished, and thereby, the transceiver is released.

The acceptance decision part 211 obtains the determination result on the allocation allowableness/disallowableness of the spread code in the spread code management/allocation processing part 208, the determination result on the allocation allowableness/disallowableness of the hardware device in the hardware device management/allocation processing part 213, and the determination result on the allocation allowableness/disallowableness of the radio resources in the base-station apparatus 111. Then, the acceptance decision part 211 determines whether a radio channel can be set up, based on these determination results. When a radio channel can be set up, the radio network control apparatus 113 performs processing which sets up a radio channel.

Figure 10:
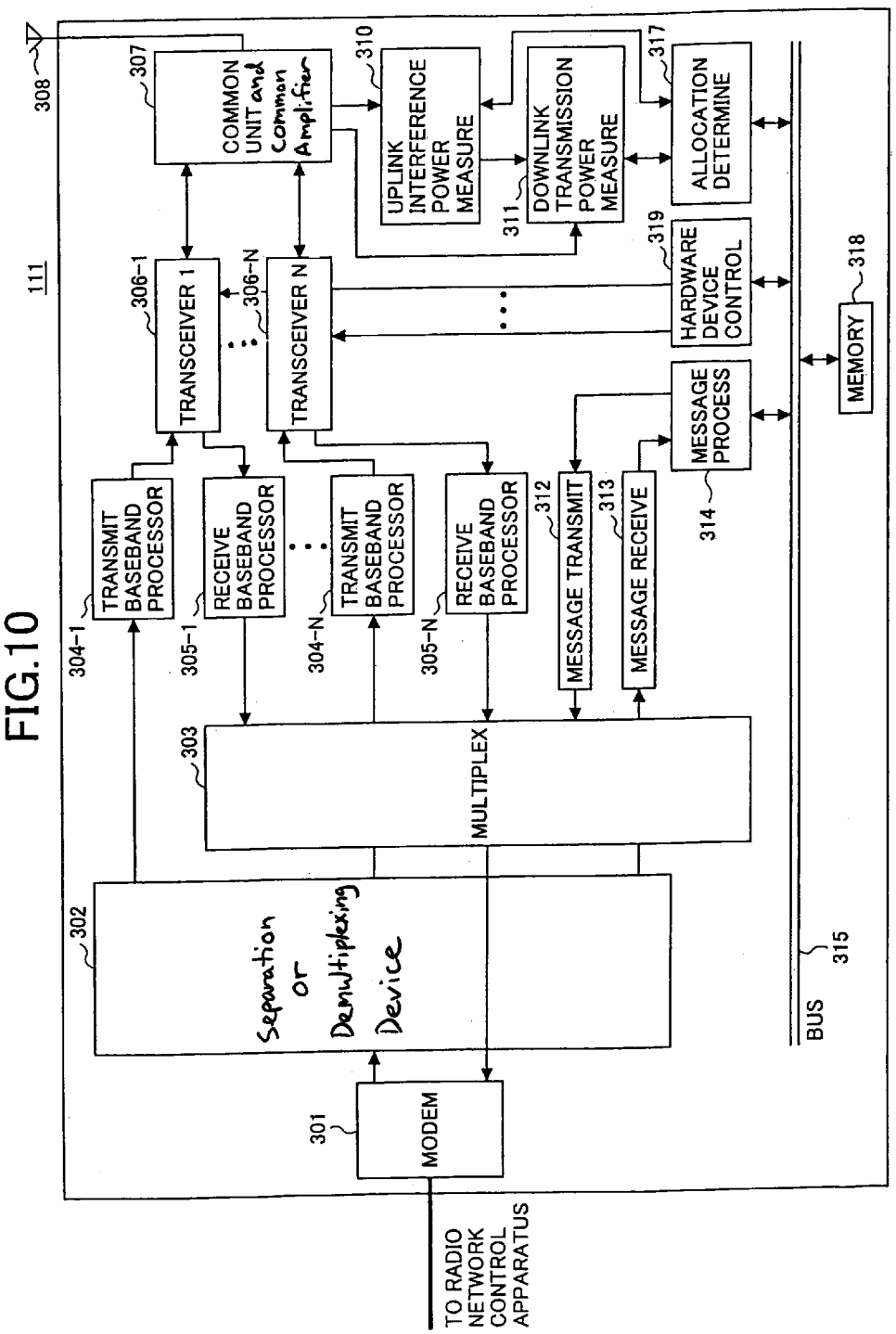
FIG. 10 shows an example of a configuration of a base-station apparatus in the second embodiment of the present invention.

FIG. 10 shows an example of a configuration of a base-station apparatus in the second embodiment of the present invention. In the base-station apparatus 111 shown in FIG. 10, the hardware device allocation control part 316 is replaced by a hardware device control part 319. as compared with the base-station apparatus 111 of the first embodiment shown in FIG. 5.

The hardware device control part 319 performs processing which allocates one of the transceivers 306-1 through 306-N on the occasion of communications between the base-station apparatus 111 and mobile-station apparatus 112 according to hardware device allocation instructions given by the radio network control apparatus 113.

Figure 11:
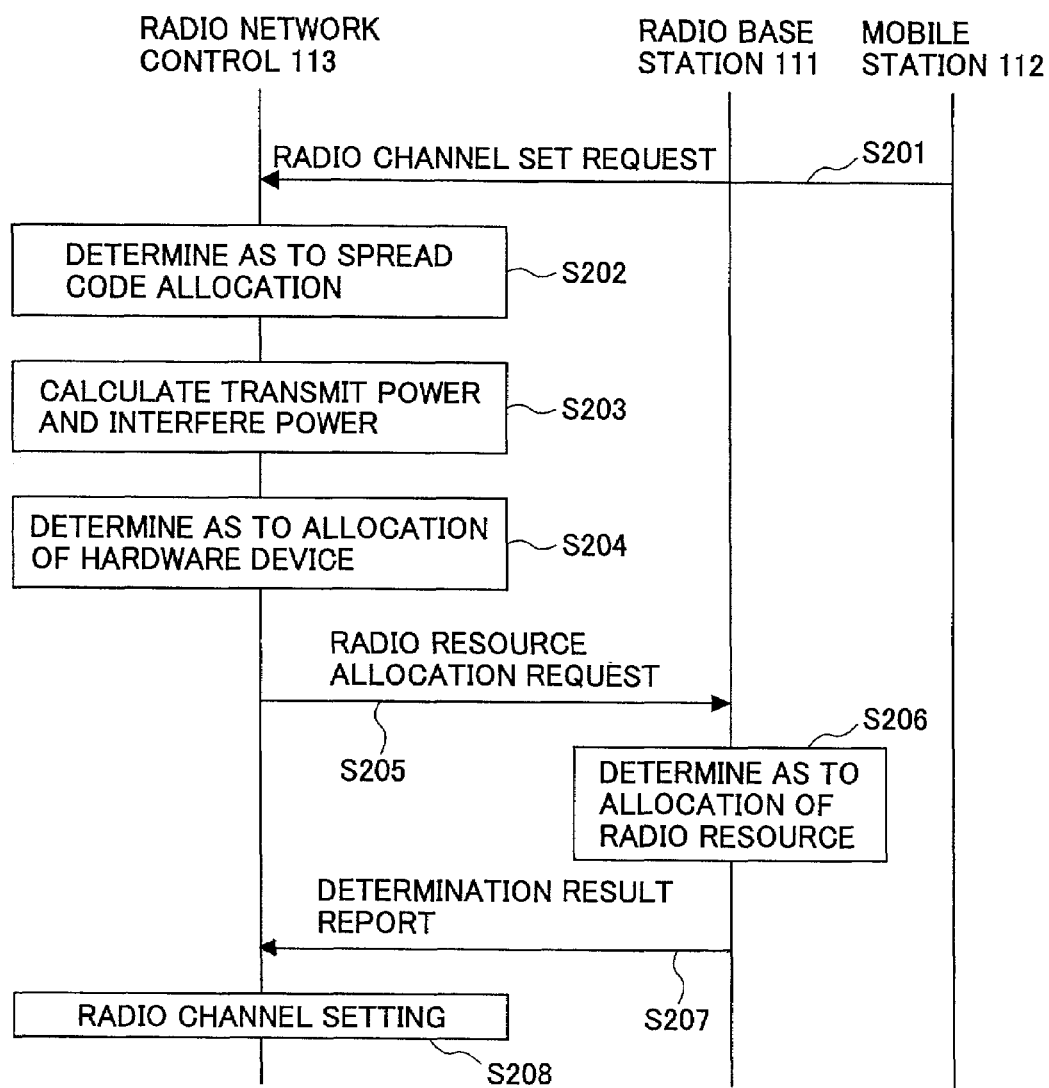
FIG. 11 shows a sequence illustrating operation of the mobile communications system in the second embodiment of the present invention.

FIG. 11 shows operation of the mobile communications system 100 in the second embodiment of the present invention. The mobile-station apparatus 112 requires a setup of a radio channel of the radio network control apparatus 113 through the base-station apparatus 111 (in a step S201).

The radio network control apparatus 113 determines whether or not allocation of a spread code to the base-station apparatus 111 is possible when the setting request for radio channel is received (in a step S202). When allocation of a spread code is not possible, the radio network control apparatus 113 informs the mobile-station apparatus 112 of this matter, and ends the processing.

When allocation of a spread code is possible, the radio network control apparatus 113 calculates the second downlink transmission electric power and the second uplink interference electric power (in a step S203). Then, it is determined whether or not allocation of the hardware device (transceiver 306) in the base-station apparatus 111 is possible, by the radio network control apparatus 113 (in a step S204) with reference to the hardware device management table described above. When allocation of hardware device is not possible, the radio network control apparatus 113 informs the mobile-station apparatus 112 of this matter, and ends the processing.

When allocation of hardware device is possible, the radio network control apparatus 113 transmits a message which requires allocation of radio resources, to the base-station apparatus 111 (in a step S205). This message includes the second downlink transmission electric power and second uplink interference electric power calculated in the step S203.

When receiving this message, the base-station apparatus 111 determines whether or not radio resources can be allocated based on the measured first downlink transmission electric power and first uplink interference electric power, and, also, the second downlink transmission electric power and second uplink interference electric power included in the message (in a step S206), and informs, of this determination result, the radio network control apparatus 113 (in a step S207).

The radio network control apparatus 113 performs processing which sets up a radio channel, when this informed determination result indicates that allocation is possible (in a step S208). On the other hand, when this informed determination result indicates that allocation is not possible, the radio network control apparatus 113 informs the mobile-station apparatus 112 of this matter, and ends the processing.

Figure 12:
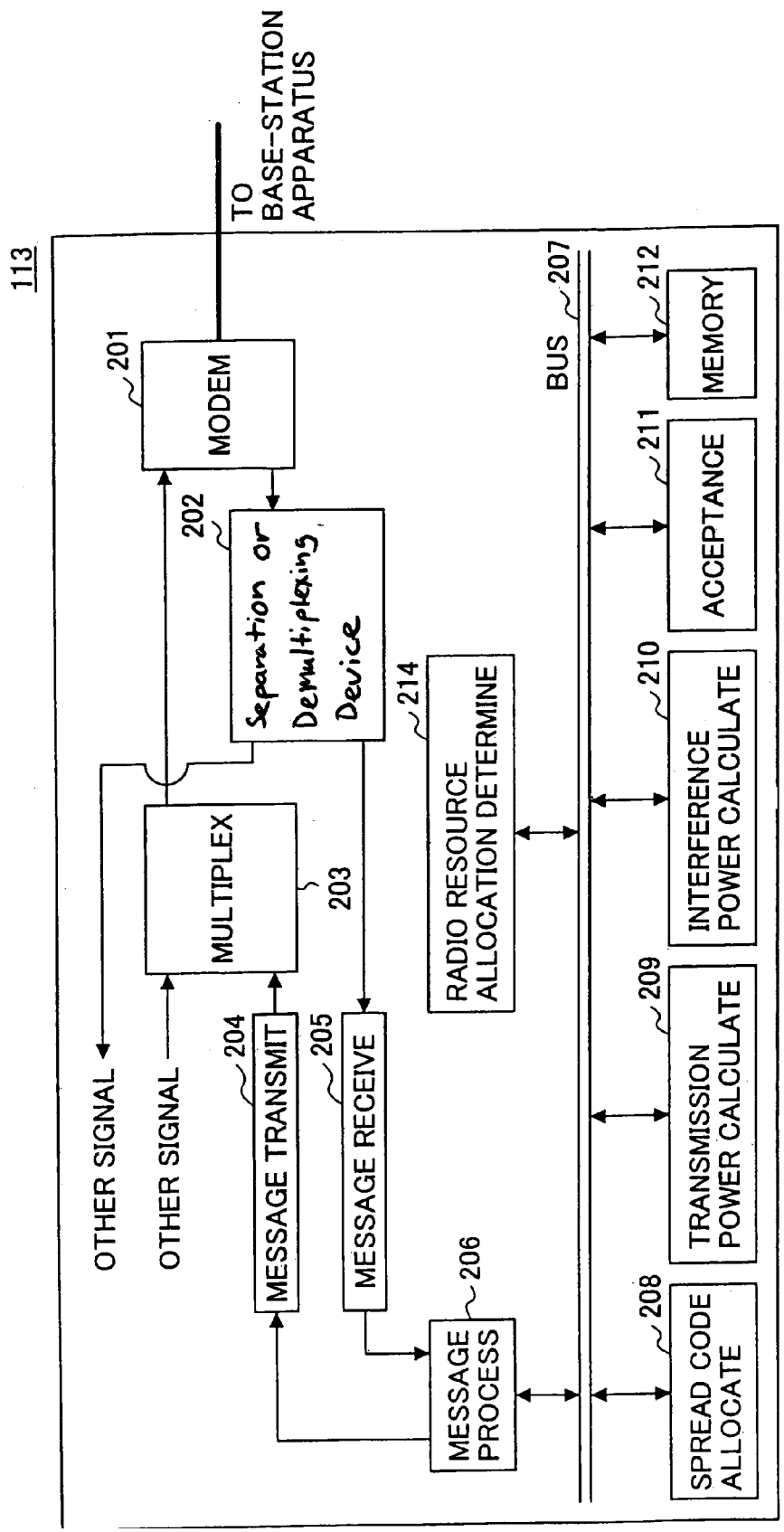
FIG. 12 shows an example of a configuration of the radio network control apparatus in a third embodiment of the present invention.

A third embodiment of the present invention will now be described. FIG. 12 shows an example of a configuration of a radio network control apparatus in the third embodiment of the present invention. As compared with the radio network control apparatus 113 in the first embodiment shown in FIG. 3, the radio network control apparatus 113 shown in FIG. 13 newly includes a radio resource allocation determining part 214.

When the radio resource allocation determining part 214 receives a request such that a radio channel be set up between the base-station apparatus 111 and mobile-station apparatus 112, it calculates a sum of the first uplink interference electric power which is measured in the base-station apparatus 111 and informed of therefrom and the second uplink interference electric power calculated by the interference electric power calculation part 210, and also, calculates a sum of the first downlink transmission electric power measured in the base-station apparatus 111 and informed of therefrom and the first downlink transmission electric power calculated by the transmission electric power calculation part 209.

Then, when the sum of the first uplink interference electric power and the second uplink interference electric power thus calculated is smaller than a predetermined threshold, the radio resource allocation determining part 214 determines that radio resources for an uplink circuit directed to the base-station apparatus 111 from the mobile-station apparatus 112 can be allocated. When the sum of the first downlink transmission electric power and second downlink transmission electric power thus calculated is equal to or smaller than a predetermined threshold, the radio resource allocation determining part 214 determines that radio resources for a downlink circuit directed to the mobile-station apparatus 112 from the base-station apparatus 111 can be allocated. The allocation determining part 214 finally determines that allocation of radio resources is possible, when allocation of the radio resources for both the uplink circuit and downlink circuit is possible.

The acceptance decision part 211 acquires the determination result on the allocation allowableness/disallowableness of the spread code in the spread code management/allocation processing part 208, the determination result on the allocation allowableness/disallowableness of the radio resources in the radio resource allocation determining part 214, and the determination result on the allocation allowableness/disallowableness of the hardware device (transceiver) in the base-station apparatus 111 made in the base-station apparatus 111, and determines whether or not a radio channel can be set up, based on these determination results. When a radio channel can be set up, the radio network control apparatus 113 performs processing which sets up a radio channel in response to the relevant request.

Figure 13:
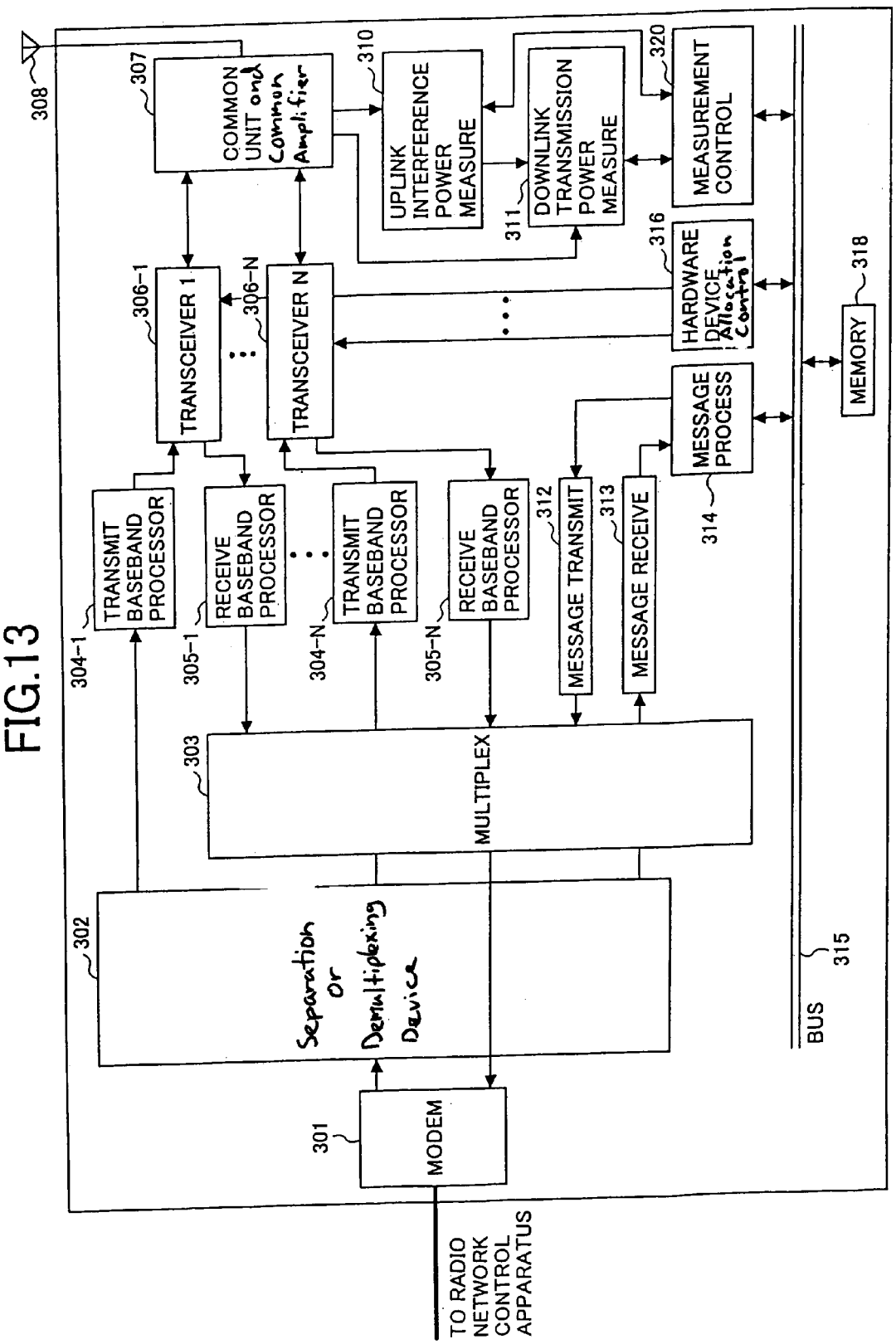
FIG. 13 shows an example of a configuration of the base-station apparatus in the third embodiment of the present invention.

FIG. 13 shows an example of a configuration of the base-station apparatus in the third embodiment of the present invention. In the base-station apparatus 111 shown in FIG. 13, the allocation allowableness/disallowableness determining part 317 is replaced by a measurement control part 320, as compared with the base-station apparatus 111 in the first embodiment shown in FIG. 5.

The measurement control part 320 performs control of the interference electric power measuring unit 310 and the transmission electric power measuring unit 311, and control of informing the radio network control apparatus 113 of the first uplink interference electric power measured by the uplink interference electric power measurement unit 310 and the first downlink transmission electric power measured by the transmission electric power measurement unit 311.

Figure 14:
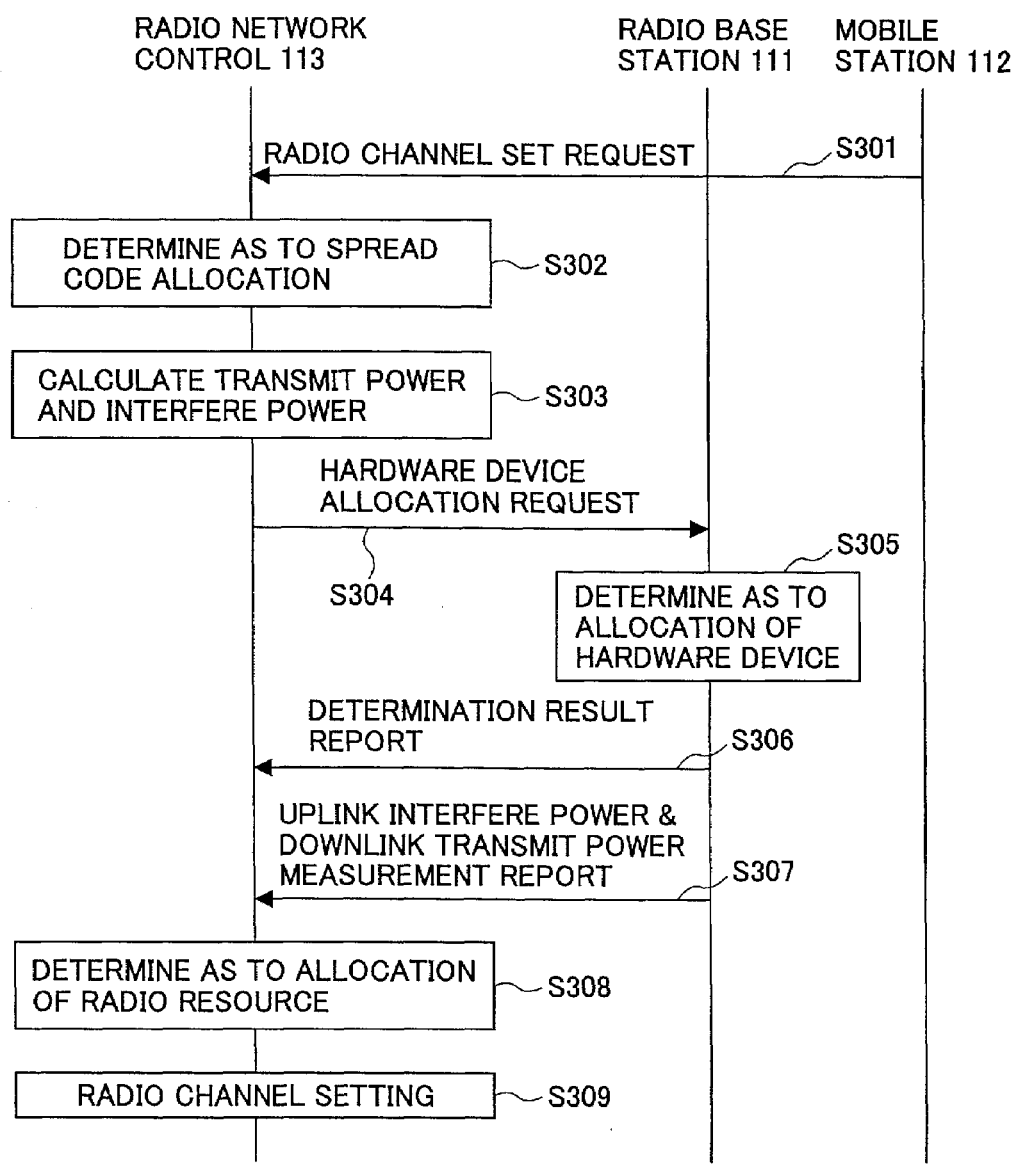
FIG. 14 shows a sequence illustrating operation of the mobile communications system in the third embodiment of the present invention.

FIG. 14 shows operation of the mobile communications system 100 in the third embodiment. The mobile-station apparatus 112 requires a setup of a radio channel of the radio network control apparatus 113 through the base-station apparatus 111 (in a step S301).

The radio network control apparatus 113 determines whether or not a spread code can be allocated to the base-station apparatus 111 when the setting request for radio channel is received (in a step S302). When allocation of a spread code is not possible, the radio network control apparatus 113 informs the mobile-station apparatus 112 of this matter, and ends the processing.

On the other hand, when allocation of a spread code is possible, the radio network control apparatus 113 calculates the second downlink transmission electric power and the second uplink interference electric power (in a step S303). Then, the radio network control apparatus 113 transmits a message which requires allocation of hardware device (transceiver 306), to the base-station apparatus 111 (in a step S304). According to this request, the base-station apparatus 111 determines whether or not allocation of the hardware device (transceiver 306) is possible (in a step S305), and informs, of the determination result, the radio network control apparatus 113 (in a step S306). Then the base-station apparatus 111 measures the first uplink interference electric power and the first downlink transmission electric power through the measurement units 310 and 311, and informs, of the measurement results, the radio network control apparatus 113 (in a step S307).

When the determination result on the allocation allowableness/disallowableness of the hardware device from the base-station apparatus 111 indicates that allocation of hardware device is not possible, the radio network control apparatus 113 informs the mobile-station apparatus 112 of this matter, and ends the processing.

On the other hand, when the determination result on the allocation allowableness/disallowableness of the hardware device from the base-station apparatus 111 indicate that allocation of hardware device is possible, the radio network control apparatus 113 determines, based on the first downlink transmission electric power and first uplink interference electric power informed of from the base-station apparatus 111, and the calculated second downlink transmission electric power and second uplink interference electric power in the step S303, whether or not allocation of radio resources is possible (in a step S308).

Then, the radio network control apparatus 113 performs processing which sets up a radio channel, when this determination result indicates that allocation of radio resources is possible (in a step S309). On the other hand, when this determination result indicates that allocation of radio resources is not possible, the radio network control apparatus 113 informs the mobile-station apparatus 112 of this matter, and ends the processing.

The first interference electric power and the first transmission electric power are measured and the measurement results are informed of to the radio network control apparatus 113 as a response from the base-station apparatus 111 to a request from the radio network control apparatus 113 in this sequence shown in the figure. However, alternatively, the base-station apparatus 111 may measure the first interference electric power and the first transmission electric power periodically, the measurement results may then be informed of, and the radio network control apparatus 113 may determine whether allocation of radio resources is possible using the thus-obtained latest measurement results.

Figure 15:
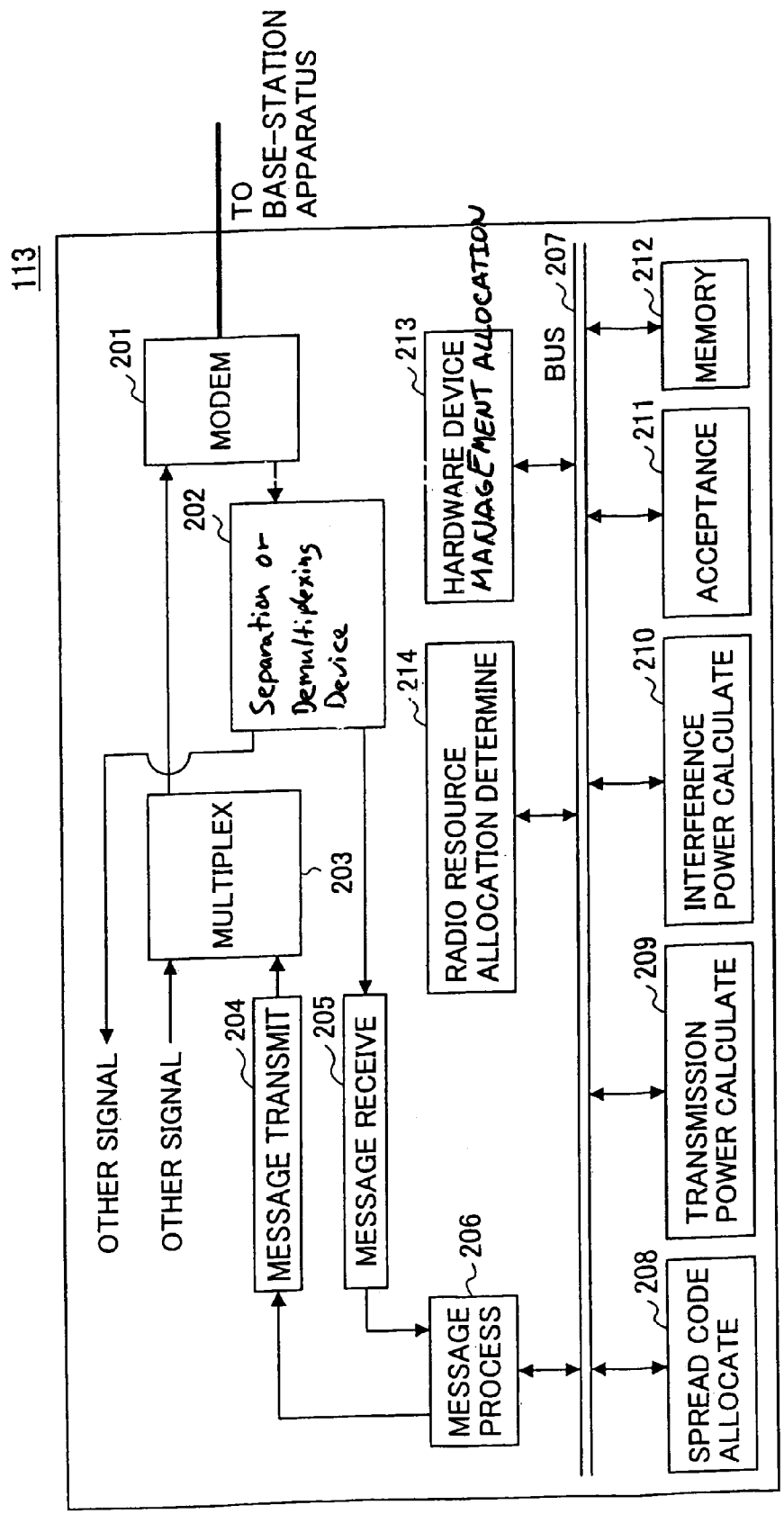
FIG. 15 shows an example of a configuration of the radio network control apparatus in a forth embodiment of the present invention.

A fourth embodiment of the present invention will now be described. FIG. 15 shows an example of a configuration of a radio network control apparatus in the fourth embodiment of the present invention. As compared with the radio network control apparatus 113 of the first embodiment shown in FIG. 3, the radio network control apparatus 113 shown in FIG. 15 newly includes a hardware device management/allocation processing part 213 and a radio resource allocation determining part 214. Since the hardware device management/allocation processing part 213 is the same as the hardware device management/allocation processing part 213 in the radio network control apparatus 113 in the second embodiment, shown in FIG. 8, and the radio resource allocation determining part 214 is the same as the radio resources allocation determining part 214 in the radio network control apparatus 113 in the third embodiment shown in FIG. 12, the duplicated description is omitted.

The acceptance decision part 211 obtains the determination result on the allocation allowableness/disallowableness of the spread code in the spread code management/allocation processing part 208, the determination result on the allocation allowableness/disallowableness of the hardware device (transceiver) in the base-station apparatus 111 from the hardware device management/allocation processing part 213, and the determination result on the allocation allowableness/disallowableness of the radio resources in the radio resources allocation determining part 214, and determines whether a radio channel can be set up, based on these determination results. When a radio channel can be set up, the radio network control apparatus 113 performs processing which sets up the radio channel.

FIG. 16 shows an example of a configuration of a base-station apparatus in the fourth embodiment of the present invention. In the base-station apparatus 111 shown in FIG. 16, the hardware device allocation control part 316 is replaced by a hardware device control part 319, and, also, the allocation allowableness/disallowableness determining part 317 is replaced by a measurement control part 320, as compared with the base-station apparatus 111 of the first embodiment shown in FIG. 5. Since the hardware device control part 319 is the same as the hardware device control part 319 in the base-station apparatus 111 of the second embodiment shown in FIG. 10 and the measurement control part 320 is the same as the measurement control part 320 in the base-station apparatus 111 of the third embodiment shown in FIG. 13, the duplicated description is omitted.

FIG. 17 shows operation of the mobile communications system 100 in the fourth embodiment of the present invention. The mobile-station apparatus 112 requires a setup of a radio channel of the radio network control apparatus 113 through the base-station apparatus 111 (in a step S401).

The radio network control apparatus 113 determines whether allocation of a spread code can be made for the base-station apparatus 111 when the setting request for radio channel is received (in a step S402). When allocation of a spread code is not possible, the radio network control apparatus 113 informs the mobile-station apparatus 112 of this matter, and ends the processing.

On the hand, when allocation of a spread code is possible, the radio network control apparatus 113 calculates the second downlink transmission electric power and the second uplink interference electric power (in a step S403). Then, it is determined whether allocation of the hardware device (transceiver 306) is possible in the base-station apparatus 111, by the radio network control apparatus 113 (in a step S404). When allocation of the hardware device is not possible, the radio network control apparatus 113 informs the mobile-station apparatus 112 of this matter, and ends the processing.

On the other hand, when allocation of the hardware device is possible, the radio network control apparatus 113 requests the radio base station 111 to measure the first uplink interference electric power and the first downlink transmission electric power (in a step S405).

According to this request, the first uplink interference electric power and the first down-link transmission electric power are measured by the base-station apparatus 111, and the thus-obtained measurement results are informed of to the radio network control apparatus 113 (in a step S406).

The radio network control apparatus 113 determines whether or not allocation of radio resources is possible, based on the first downlink transmission electric power and first uplink interference electric power informed of by the base-station apparatus 111, and the second downlink transmission electric power and second uplink interference electric power calculated through the calculating units 209 and 210 (in a step S407).

Then, the radio network control apparatus 113 performs processing which sets up a radio channel, when this determination result indicates that allocation of radio resources is possible (in a step S408). On the other hand, when this determination result indicates that allocation of radio resources is not possible, the radio network control apparatus 113 informs the mobile-station apparatus 112 of this matter, and ends the processing.

The first interference electric power and the first transmission electric power are measured and the measurement results are informed of to the radio network control apparatus 113 as a response from the base-station apparatus 111 to a request from the radio network control apparatus 113 in this sequence shown in the figure. However, alternatively, the base-station apparatus 111 may measure the first interference electric power and the first transmission electric power periodically, the measurement results being then informed of, and the radio network control apparatus 113 may then determine whether allocation of radio resources is possible using the thus-informed latest measurement results.

Specific examples of determining whether or not allocation of radio resources is possible in each of the first through fourth embodiments described above will now be described. FIG. 18 shows an example of a threshold table managed in the base-station apparatus 111. This threshold table may be applied to the first embodiment and the second embodiment, and is stored in the memory 318 in the base-station apparatus 111.

An interference electric power threshold and a transmission electric power threshold are recorded on the threshold table. The allocation allowableness/disallowableness determining part 317 in the base-station apparatus 111 reads out these thresholds and compares the sum of the first uplink interference electric power and the second uplink interference electric power with the interference electric power threshold, and also, compares the sum of the first downlink transmission electric power and the second downlink transmission electric power with the transmission electric power threshold.

In case the sum of the first uplink interference electric power and the second uplink interference electric power is equal to or smaller than the interference electric power threshold, and also, the sum of the first downlink transmission electric power and second downlink transmission electric power is equal to or smaller than the transmission electric power threshold, the allocation allowableness/disallowableness determining part 317 determines that radio resources can be allocated. Alternatively, only one of the interference electric power threshold and transmission electric power threshold may be recoded on the threshold table.

FIG. 19 shows an example of a threshold table managed in the radio network control apparatus 113. This threshold table may be applied to the third embodiment and fourth embodiment, and is stored in the memory 212 in the radio network control apparatus 113.

An interference electric power threshold and a transmission electric power threshold are recorded on the threshold table provided every base-station apparatus 111 subordinate of the radio network control apparatus 113. The radio resource allocation determining part 214 in the radio network control apparatus 113 uses this threshold table in determining allocation allowableness/disallowableness of radio resources.

FIG. 20 shows an example of a parameter table. The second downlink interference electric power (interference electric power increase amount) and second downlink transmission electric power (required transmission electric power) are recorded on this parameter table. These values are recorded for every physical channel, and used for deriving the abovementioned second uplink interference electric power and second downlink transmission electric power.

This parameter table may be stored in any of the memory 212 in the radio network control apparatus 113, and the memory 318 in the base-station apparatus 112. In particular, when the parameter table is stored in the memory 318 in the base-station apparatus 111, it becomes unnecessary for the base-station apparatus 112 to acquire these electric power values from the radio network control apparatus 113. Alternatively, only one of the interference electric power increase amount and required transmission electric power may be recorded in the parameter table.

The second uplink interference electric power (the increase amount of the interference electric power) and the second downlink transmission electric power (required transmission electric power) become determined uniquely according to the parameter table shown in FIG. 20 when the physical is determined. However, in order to derive the values with more high accuracy, the following calculation may be made.

The above-mentioned increase amount of interference electric power 'Increases' is calculated, for example, by the following formula:

$$\text{Increase} = I \times Ec/Io \times Rc$$

where:
Rc (cps) denotes a chip rate;
Ec/Io denotes a required ratio of energy per one chip Ec to interference electric power density Io;
I (W) denotes a current measurement value of uplink interference electric power (all the interference electric power in the spread band).

Alternatively, the increase amount of interference electric power 'Increase' may be calculated by the following formula:

$$\text{Increase} = I \times Eb/Io \times Ri$$

where:
Ri (bps) denotes an information bit rate;
Eb/Io denotes a required ratio of energy per one bit of information Eb to interference electric power density Io;
I (W) denotes a current measurement value of uplink interference electric power (all the interference electric power in the spread band).

The increase in interference electric power occurring due to setting up of a new radio channel becomes larger as the current interference electric power is larger, and a value with more high accuracy can be derived by performing these operations. These calculation examples are merely examples, and it is possible to further improve the accuracy by performing some correction, or to improve tolerance against measurement error by multiplying a safety coefficient.

The above-mentioned required transmission electric power P may be calculated, for example, by the following formula:

$$P = P\text{pilot} \times 1/SF \times 1/(Ec/Io) \times SIR$$

where:

Ec/Io denotes a required ratio of energy per one chip Ec on the pilot channel to interference electric power density Io measured in the mobile-station apparatus;

SF denotes a spreading factor on a radio channel to be set;

SIR denotes a signal to noise ratio required for the communications; and

Ppilot denotes a transmission electric power (W) on the pilot channel in the base-station apparatus.

The required transmission electric power on the radio channel to be newly set depends on whether the reception electric power in the mobile-station apparatus on the pilot channel transmitted by the base-station apparatus at a fixed transmission electric power is large or small, in other words, depends on whether the mobile-station apparatus exists near to or far from the base-station apparatus. Further, the transmission electric power required for a newly set radio channel depends on the magnitude of interference. These factors are represented by the Ec/Io on the pilot channel measured in the mobile-station apparatus, and, by calculating the required transmission electric power using this value, it is possible to calculate the value with higher accuracy.

Instead of such a method, a calculation formula may be used such that, only based on the reception level on the pilot channel measured in the mobile-station apparatus, in other words, the distance from the base-station apparatus, the smaller transmission electric power is obtained as the mobile-station apparatus exists nearer to the base-station apparatus, while, the larger transmission electric power is obtained as the mobile-station apparatus exists farther from the base-station apparatus. The calculation example described above is merely an example, and it is possible to further improve the accuracy by performing some correction, or to improve tolerance against measurement error by multiplying safety coefficient.

Thus, in the mobile communications system 100, by the base-station apparatus 111 and the radio network control apparatus 113, it is determined whether or not a spread code, hardware device, and radio resources can be allocated, and when they can be allocated, a radio channel is set up between the base-station apparatus and the mobile-station apparatus. That is, as it is determined whether a setup of a radio channel is possible, in consideration of these plurality of factors in combination, it becomes possible to maintain high communication quality.

In the above description, the term 'radio channel' may be a physical channel defined by a different symbol rate or a different spreading factor. Alternatively, it is also possible that, although the same physical channel in origin, it is regarded as different channels as a result of having different utilization methods such as different coding systems. Furthermore, it may also be possible that, although the physical channel is originally same and also the utilization method thereof is also same, it is regarded as different channels as a result of providing different services. Thus, in the above-described embodiments, a classification way of radio channel is not limited, and, thus, the present invention can be applied regardless of a manner by which radio channel is classified.

Furthermore the present invention is not limited to a system which employs W-CDMA as in the above-described embodiments, and, the present invention can be applied a mobile communications system as long as the system employs a CDMA scheme.

Moreover, in the embodiments described above, the radio network control apparatus performs setting of radio channel. However, the base-station apparatus may carry out the same operation instead. Moreover, the base-station apparatus may determine whether or not allocation of all of spread code, hardware device, and radio resources, for example.

Moreover, in the embodiments described above, a setting request for a radio channel is made from the mobile-station apparatus. However, the present invention can be applied for a case where a setting request for a radio channel is made by a fixed telephone set in a fixed telephone network, or for a case a setting request for a radio channel is made by a mobile-station apparatus in a cell defined by a base-station apparatus subordinate of another radio network control apparatus in the same mobile communications system.

Thus, according to the present invention, it is determined whether a spread code, hardware device, and radio resources can be allocated, and when they can be allocated, setting up of a radio channel is made between a base-station apparatus and a mobile-station apparatus, upon a request. That is, as it is determined whether a setup of a radio channel is possible by taking into account of a plurality of factors synthetically, it becomes possible to maintain high communication quality.

Further, the present invention is not limited to the above-described embodiments, and variations and modifications may be made without departing from the scope of the present invention.

The present application is based on Japanese priority application No. 2001-39180, filed on Feb. 15, 2001, the entire contents of which are hereby incorporated by reference.

What is claimed is:

1. A radio channel setting control method of controlling a radio channel used for communications between a base-station apparatus and a mobile-station apparatus in a mobile communications system employing a CDMA scheme including the base-station apparatus, mobile-station apparatus, and a radio network control apparatus controlling the base-station apparatus, comprising the steps of:

a) determining whether or not a spread code used for the communications can be allocated;

b) determining whether or not a predetermined hardware device can be allocated;

c) determining whether or not a radio resource can be allocated; and d) setting the radio channel between the base-station apparatus and mobile-station apparatus when it is determined that the spread code, predetermined hardware device and radio resource can be allocated, wherein said determining whether or not a spread code used for the communications can be allocated step includes accessing a spread code management table and determining that the spread code can be allocated when there is an unused channelization code.

2. The method as claimed in 1, further comprising:
measuring a first uplink interference, which is a total of interference directed to the base-station apparatus from the mobile-station apparatus; and
determining that the radio resource can be allocated if the measured first uplink interference is equal to or smaller than a first threshold.

3. The method as claimed in claim 2, further comprising:
determining to allow allocation of a radio resource for an uplink circuit directed to the base-station apparatus from the mobile-station apparatus when the first uplink interference is equal to or smaller than the first threshold.

4. The method as claimed in claim 1, further comprising:
measuring a first downlink transmission power, which is the total of transmission power directed to the mobile-station apparatus from the base-station apparatus; and
determining to allow allocation of the radio resource if the thus-obtained first downlink transmission power is equal to or smaller than a second threshold.

5. The method as claimed in claim 4, further comprising:
determining that a radio resource for a downlink circuit directed to the mobile station apparatus from the base-station can be allocated if the first downlink transmission power is equal to or smaller than the second threshold.

6. The method as claimed in claim 4, further comprising:
determining allocation allowableness/disallowableness of the spread code used for the communications by the radio network control apparatus;
measuring the first uplink interference and the first downlink transmission power by the base-station apparatus;
determining, based on the measured first uplink interference and the first down-link transmission power, the allocation allowableness/disallowableness of the radio resource used for the communication;
determining the allocation allowableness/disallowableness of the predetermined hardware device in the base-station apparatus used for the communications by the base-station apparatus;
informing the radio network control apparatus of the determination results on the allocation allowableness/disallowableness of the radio resource and predetermined hardware device; and
setting the radio channel when each of all the determination results on the allocation allowableness/disallowableness for the above-mentioned spread code, predetermined hardware device, and radio resource is affirmative by the radio network control apparatus.

7. The method as claimed in claim 4, further comprising:
determining the allocation allowableness/disallowableness of the spread code used for the communications by the radio network control apparatus;
determining the allocation allowableness/disallowableness of the predetermined hardware device in the base-station apparatus used for the communications by the radio network control apparatus;
measuring the first uplink interference and the first downlink transmission power by the base station apparatus;
determining, based on the thus-obtained first uplink interference and first downlink transmission power, the allocation allowableness/disallowableness of the radio resource used for the communications by the base-station apparatus;
informing the determination result of the allocation allowableness/disallowableness of the radio resource the radio network control apparatus; and
setting the radio channel between the base-station apparatus and mobile-station apparatus if each of the determination results on the allocation allowableness/disallowableness of the spread code, predetermined hardware device, and the radio resource is affirmative.

8. The method as claimed in claim 4, further comprising:
determining the allocation allowableness/disallowableness of the predetermined hardware device in the base-station apparatus used for the communications by the base-station apparatus;
measuring the first uplink interference and first downlink transmission power by the base-station apparatus;
informing the determination result of the allocation allowableness/disallowableness of the predetermined hardware device, and the first uplink interference and first downlink which transmission power measured to the radio network control apparatus;
determining allocation allowableness/disallowableness of the spread code used for the communications by the radio network control apparatus;
determining, based on the first uplink interference and the first downlink transmission power informed of by the base-station apparatus, allocation allowableness/disallowableness of the radio resource used for the communications by the radio network control apparatus; and
setting the radio channel between the base-station apparatus and mobile-station apparatus by the radio network control apparatus if each of all the determination results on the allocation allowableness/disallowableness for the spread code, predetermined hardware device, and the radio resource is affirmative.

9. The method as claimed in claim 4, further comprising:
determining allocation allowableness/disallowableness of the spread code used for the communications by the radio network control apparatus;
determining allocation allowableness/disallowableness of the predetermined hardware device in the base-station apparatus used for the communications by the radio network control apparatus;
measuring the first uplink interference and first downlink transmission power by the base-station apparatus;
informing the radio network control apparatus of the thus-obtained first uplink interference and first downlink transmission power;
deterring, based on the thus-obtained first uplink interference power and first downlink transmission power, the allocation allowableness/disallowableness of the radio resource used for the communications by the network control apparatus; and
setting the radio channel between the base station apparatus and the mobile-station apparatus by the network control apparatus if each of the determination results on the allocation allowableness/disallowableness of the spread code, predetermined hardware device, and radio resource is affirmative.

10. The method as claimed in claim 1, further comprising:
deriving a second uplink interference directed to the base-station apparatus from the mobile-station apparatus newly occurring by the communications;
measuring the first uplink interference, which is the total of interference directed to the base-station apparatus from the mobile-station apparatus;
calculating a sum of the thus-obtained second up link interference and first uplink interference; and
determining that allocation of the radio resource used for the communications is allowable if the sum of the first uplink interference and second uplink interference is equal to or smaller than a third threshold.

11. The method as claimed in claim 10, further comprising:
determining to allow allocation of a radio resource for an uplink circuit directed to the base station apparatus from the mobile-station apparatus if the sum of the first uplink interference and the second uplink interference is equal to or smaller than the third threshold.

12. The method as claimed in claim 10, further comprising:
deriving the second uplink interference based on at least one of a chip rate, an information transmission rate of the communications, a signal to noise ratio corresponding to the chip rate or the information transmission rate of the communications, and the uplink interference.

13. The method as claimed in claim 1, further comprising:
measuring a first downlink transmission power directed to the mobile-station apparatus from the base-station apparatus;
deriving a second downlink transmission power directed to the mobile-station apparatus from the base-station apparatus; and
determining to allow allocation of the radio resource used for the communications if the sum of the first down-link transmission power and second down-link transmission power is equal to or smaller than a fourth threshold.

14. The method as claimed in claim 13, further comprising:
allowing allocation of a radio resource for a down-link circuit directed to the mobile-station apparatus from the base station apparatus if the calculated sum of the second down-link transmission power and first down-link transmission power is equal to or smaller than the fourth threshold.

15. The method as claimed in claim 13, further comprising:
deriving the second downlink transmission power based on at least one of a quality on a pilot channel and reception power in the mobile-station apparatus.

16. The method as claimed 13, comprising:
deriving the second downlink transmission power based on at least a ratio of a receiving energy per one chip on a pilot channel to an interference in the mobile-station apparatus, a spreading factor of a physical channel used for the communications, a signal to noise ratio, and a transmission power on the pilot channel in the base-station apparatus.

17. The method as claimed in claim 13, further comprising:
determining allocation allowableness/disallowableness of the spread code used for the communications by the radio network control apparatus;
deriving at least one of the second uplink interference and second downlink transmission power by the radio network control apparatus;
informing the base-station apparatus, of the derived the second uplink interference, and, of the second down-link transmission power;
measuring the first uplink interference and first downlink transmission power by the base-station apparatus;
if the derived second uplink interference is transmitted by the radio network control apparatus, calculating a sum of the first uplink interference and the second uplink interference by the base station,
if the derived second downlink transmission power is transmitted by the radio network control apparatus, calculating a sum of the first downlink transmission power and the second downlink transmission power by the base station apparatus;
if both the sum of the first uplink interference and second uplink interference and the sum of the first downlink transmission power and second downlink transmission power are calculated, determining allocation allowableness/disallowableness for the radio resource used for the communications based on the sum of the first uplink interference and second uplink interference and the sum of the first downlink transmission power and the second downlink transmission power;
if only the sum of the first uplink interference and second uplink interference power is calculated, determining allocation allowableness/disallowableness for the radio resource used for the communications is based on the sub of the first uplink interference and second uplink interference;
if only the sum of the first downlink transmission power and second downlink transmission power is calculated, determining allocation allowableness/disallowableness for the radio resource used for the communications is based on the sum of the first downlink transmission power and second downlink transmission power;
determining allocation allowableness/disallowableness for the predetermined hardware device in the base-station apparatus used for the communications;
informing the radio network control apparatus of the thus-obtained determination results on the allocation allowableness/disallowableness for the radio resource and hardware device; and
setting the radio channel between the base-station apparatus and mobile-station apparatus by the radio network control apparatus when each of all of the determination results on the allocation allowableness/disallowableness for the spread code, predetermined hardware device and radio resource is affirmative.

18. The method as claimed in claim 13, further comprising:
determining allocation allowableness/disallowableness for the spread code used for the communications by the radio network control apparatus;
determining allocation allowableness/disallowableness for the predetermined hardware device in the base-station apparatus used for the communications by the radio network control apparatus;
deriving at least one of the second uplink interference and second downlink transmission power by the radio network control apparatus;
if the second uplink interference is derived, informing the base station apparatus of the second uplink interference;
if the second downlink transmission power is derived, informing the base-station apparatus of the second downlink transmission power;
measuring the first uplink interference and first downlink transmission power by the base-station apparatus;
if the second uplink interference is transmitted by the radio network control apparatus, calculating a sum of the first uplink interference and the second uplink interference by the base-station apparatus,
if the second downlink transmission power is transmitted by the radio network control apparatus, calculating a sum of the first downlink transmission power and the second downlink transmission power by the base-station apparatus;

if both the sum of the first uplink interference and second uplink interference and the sum of the first downlink transmission power and second downlink transmission power are calculated, determining allocation allowableness/disallowableness for the radio resource used for the communications based on the sum of the first uplink interference and second uplink interference and the sum of the first downlink transmission power and second downlink transmission power;

if only the sum of the first uplink interference and second uplink interference is calculated, determining allocation allowableness/disallowableness for the radio resource used for the communications based on the sum of the first uplink interference and second uplink interference;

if only the sum of the first downlink transmission power and second downlink transmission power is calculated, determining allocation allowableness/disallowableness for the radio resource used for the communications based on the sum of the first downlink transmission power and second downlink transmission power;

informing the radio network control apparatus of the obtained determination result for the spread code and hardware resource; and setting the radio channel between the base-station apparatus and mobile-station apparatus by the network control apparatus when each of all of the determination results on the allocation allowableness/disallowableness for the spread code, predetermined hardware device and radio resource is affirmative.

19. The method as claimed in claim 13, further comprising:

determining allocation allowableness/disallowableness for the predetermined hardware device in the base-station apparatus used for the communications by the base-station apparatus;

measuring the first uplink interference and first downlink transmission power by the base-station apparatus;

informing the radio network control apparatus of the determination result on the allocation allowableness/disallowableness for the predetermined hardware device, and the measured first uplink interference and first downlink transmission power;

determining allocation allowableness/disallowableness for the spread code used for the communications by the network control apparatus;

deriving at least one of the second uplink interference and second downlink transmission power by the network control apparatus;

if the second uplink interference is derived, calculating a sum of the first up link interference and the second uplink interference;

if the second downlink transmission power is derived, calculating a sum of the first downlink transmission power and the second downlink transmission power;

if both the sum of the first uplink interference and second uplink interference and the sum of the first downlink transmission power and second downlink transmission power are calculated, determining allocation allowableness/disallowableness for the radio resource used for the communications based on the sum of the first uplink interference and second uplink interference and the sum of the first downlink transmission power and second downlink transmission power;

if only the sum of the first uplink interference and second uplink interference is calculated, determining allocation allowableness/disallowableness for the radio resource used for the communications based on the sum of the first uplink interference and second uplink interference;

if only the sum of the first downlink transmission power and second downlink transmission power is calculated, determining allocation allowableness/disallowableness for the radio resource used for the communications based on the sum of the first downlink transmission power and second downlink transmission power;

setting the radio channel between the base-station apparatus and mobile-station apparatus by the network control apparatus when each of all of the determination results on the allocation allowableness/disallowableness for the spread code, predetermined hardware device and radio resource is affirmative.

20. The method as claimed in claim 13, further comprising:

determining allocation allowableness/disallowableness for the spread code used for the communications by the radio network control apparatus;

determining allocation allowableness/disallowableness for the predetermined hardware device in the base-station apparatus used for the communications by the radio network control apparatus; deriving at least one of the second uplink interference and second downlink transmission power by the radio network control apparatus;

measuring the first uplink interference and first downlink transmission power by the base station;

informing the radio network control apparatus of the measure first uplink interference and first downlink transmission power;

if the second uplink interference is derived, calculating a sum of the first up link interference and the second up link interference;

if the second downlink transmission power is derived, calculating a sum of the first downlink transmission power and the second downlink transmission power;

if both the sum of the first uplink interference and second uplink interference and the sum of the first downlink transmission power and second downlink transmission power are calculated, determining allocation allowableness/disallowableness for the radio resource used for the communications based on the sum of the first uplink interference and second uplink interference and the sum of the first downlink transmission power and the second downlink transmission power;

if only the sum of the first uplink interference and second uplink interference is calculated, determining allocation allowableness/disallowableness for the radio resource used for the communications based on the sum of the first uplink interference and second uplink interference;

if only the sum of the first downlink transmission power and second downlink transmission power is calculated, determining allocation allowableness/disallowableness for the radio resource used for the communications based on the sum of the first downlink transmission power and second downlink transmission power; and setting the radio channel between the base-station apparatus and mobile-station apparatus by the radio network control apparatus when each of the determination results on the allocation allowableness/disallowableness for the spread code, predetermined hardware device and radio resource is affirmative.

21. A radio network control apparatus controlling communications between a subordinate base-station apparatus and a mobile-station apparatus in a mobile communications system employing a CDMA scheme, comprising:
   a determination obtaining part configured to obtain a determination result as to whether or not a spread code used for the communications, a predetermined hardware device in the base-station apparatus and a radio resource can be allocated; and
   a radio channel setting part configured to setup a radio channel between the base-station apparatus and the mobile-station apparatus when the spread code, predetermined hardware device and radio resource can be allocated,
   wherein the determination obtaining part is configured to determine whether or not the spread code used for the communications can be allocated by accessing a spread code management table and to determine that the spread code can be allocated when there is an unused channelization code.

22. The radio network control apparatus as claimed in claim 21, further comprising:
   a spread code allocation allowableness/disallowableness determining part configured to determine allocation allowableness/disallowableness for the spread code.

23. The radio network control apparatus as claimed in claim 21, further comprising:
   a spread code allocation allowableness/disallowableness determining result receiving part configured to receive a determination result on allocation allowableness/disallowableness for the spread code from the base-station apparatus.

24. The radio network control apparatus as claimed in claim 21, further comprising:
   a hardware device allocation allowableness/disallowableness determining part configured to determine allocation allowableness/disallowableness for the predetermined hardware device.

25. The radio network control apparatus as claimed in claim 21, further comprising:
   a hardware device allocation allowableness/disallowableness determining result receiving part configured to receive a determination result on allocation allowableness/disallowableness for the predetermined hardware device from the base-station apparatus.

26. The radio network control apparatus as claimed in claim 21, further comprising:
   a radio resource allocation allowableness/disallowableness determining part configured to determine allocation allowableness/disallowableness for the radio resource.

27. The radio network control apparatus as claimed in claim 26, wherein:
   the radio resource allocation allowableness/disallowableness determining part is configured to determine that allocation of the radio resource is possible when a first uplink interference which is the total of interference directed to the base-station apparatus from the mobile-station apparatus is equal to or smaller than a first threshold.

28. The radio network control apparatus as claimed in claim 27, wherein:
   the radio resource allocation allowableness/disallowableness determining part is configured to determine that allocation of a radio resource for an uplink circuit directed to the base-station apparatus from the mobile-station apparatus is possible when the first uplink interference is equal to or smaller than of the first threshold.

29. The radio network control apparatus as claimed in claim 26, wherein:
   the radio resource allocation allowableness/disallowableness determining part is configured to determine that the radio resource can be allocated when a first downlink transmission power, which is the total transmission power directed to the mobile-station apparatus from the base-station apparatus, is equal to or smaller than a second threshold.

30. The radio network control apparatus as claimed in claim 29, wherein: the radio resource allocation allowableness/disallowableness determining part is configured to determine that a radio resource for a downlink circuit directed to the mobile-station apparatus from base-station apparatus when the first downlink transmission power is equal to or smaller than the second threshold.

31. The radio network control apparatus as claimed in claim 26, wherein:
   the radio resource allocation allowableness/disallowableness determining part is configured to determine that the radio resource can be allocated when a sum of a first uplink interference, which is a total of interference directed to the base-station apparatus from the mobile-station apparatus, and a second uplink interference directed to the base-station apparatus from the mobile-station apparatus newly occurring by the communications is equal to or smaller than a third threshold.

32. The radio network control apparatus as claimed in claim 31, wherein:
   the radio resource allocation allowableness/disallowableness determining part is configured to determine that allocation of a radio resource for a uplink circuit directed to the base-station apparatus from the mobile-station apparatus is possible when the sum of the up link interference and the second uplink interference is equal to or smaller than the third threshold.

33. The radio network control apparatus as claimed in claim 26, wherein:
   the radio resource allocation allowableness/disallowableness determining part is configured to determine that allocation of the radio resource used for the communications is possible when a sum of a first downlink transmission power, which is a total of transmission power directed to the mobile-station apparatus from the base-station apparatus, and a second downlink transmission power directed to the mobile-station apparatus from the transmission power required for the communications is equal to or smaller than a fourth threshold.

34. The radio network control apparatus as claimed in claim 33, wherein:
   the radio resource allocation allowableness/disallowableness determining part is configured to determine that allocation of a radio resource for a downlink circuit directed to the mobile-station apparatus from the base-station apparatus when the sum of the first downlink transmission power and second downlink transmission power is equal to or smaller than the fourth threshold.

35. The radio network control apparatus as claimed in claim 21, further comprising:
  a radio resource allocation allowableness/disallowableness determining result receiving part configured to receive a determination result on allocation allowableness/disallowableness for the radio resource from the base-station apparatus.

36. A base-station apparatus performing communications with a mobile-station apparatus under control of a mobile network control apparatus in a mobile communications system employing a CDMA scheme, comprising:
  an allocation allowableness/disallowableness determining part configured to determine whether allocation of at least any one a spread code used for the communications, a predetermined hardware device in the base-station apparatus and a radio resource is possible; and
  a determination result transmitting part configured to transmit a determination result of the allocation allowableness/disallowableness determining part,
  wherein allocation of a radio channel between the base-station apparatus and mobile-station apparatus is allowed when the spread code, predetermined hardware device and radio resource can be allocated, and
  the allocation allowableness/disallowableness determining part is configured to determine whether or not the spread code used for the communications can be allocated by accessing a spread code management table and to determine that the spread code can be allocated when there is an unused channelization code.

37. A mobile communications system comprising a base-station apparatus, a mobile-station apparatus and a radio network control apparatus controlling the base-station apparatus, employing a CDMA scheme, wherein at least any of the base-station apparatus and radio network control apparatus comprises:
  a spread code allocation allowableness/disallowableness determining part configured to determine whether or not a spread code used for the communications between the base-station apparatus and mobile-station apparatus can be allocated; a hardware device allocation allowableness/disallowableness determining part configured to determine whether or not a predetermined hardware device in the base-station apparatus used for the communications can be allocated; a radio resource allocation allowableness/disallowableness determining part configured to determine whether or not a radio resource used for the communications can be allocated; and a radio channel setting part configured to set a radio channel between the base-station apparatus and mobile-station apparatus when the spread code, predetermined hardware device and radio resource can be allocated,
  the spread code allocation allowableness/disallowableness determining part is configured to determine whether or not the spread code used for the communications can be allocated by accessing a spread code management table and to determine that the spread code can be allocated when there is an unused channelization code.

* * * * *